(12) United States Patent
Ito

(10) Patent No.: US 12,231,422 B2
(45) Date of Patent: Feb. 18, 2025

(54) INFORMATION PROCESSING SYSTEM, INSTALLATION DEVICE, AND COMPUTER PROGRAM PRODUCT

(71) Applicant: KABUSHIKI KAISHA TOSHIBA, Tokyo (JP)

(72) Inventor: Toshio Ito, Kawasaki Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 230 days.

(21) Appl. No.: 17/822,738

(22) Filed: Aug. 26, 2022

(65) Prior Publication Data

US 2023/0116684 A1  Apr. 13, 2023

(30) Foreign Application Priority Data

Oct. 7, 2021 (JP) .................................. 2021-165400

(51) Int. Cl.
*H04L 9/40* (2022.01)

(52) U.S. Cl.
CPC ...... *H04L 63/0823* (2013.01); *H04L 63/0869* (2013.01)

(58) Field of Classification Search
CPC .......................... H04L 63/0823; H04L 63/0869
USPC ............................................................ 726/6
See application file for complete search history.

(56) References Cited

U.S. PATENT DOCUMENTS

2020/0008059 A1* 1/2020 Fox ........................ H04W 12/06
2021/0092604 A1* 3/2021 Fox ........................ H04L 9/0891

FOREIGN PATENT DOCUMENTS

| CN | 101060391 A | * | 10/2007 |
| JP | 2015109674 A | * | 6/2015 |
| JP | 2017-41664 A | | 2/2017 |
| JP | 2019-62432 A | | 4/2019 |

(Continued)

OTHER PUBLICATIONS

Cai, Control Protocols Design for Cyber-Physical Systems, IEEE, https://ieeexplore.ieee.org/document/7428638?source=IQplus (Year: 2015).*

(Continued)

*Primary Examiner* — Zi Ye
(74) *Attorney, Agent, or Firm* — Finnegan, Henderson, Farabow, Garrett & Dunner, LLP

(57) ABSTRACT

An information processing system includes an installation device and a cyber physical system (CPS) device. The installation device includes a detection unit, a determination unit, and a first communication unit. The detection unit detects a communication state of a first network to which a first CPS server device is connected. The determination unit determines the first CPS server device or a second CPS server device as an initial registration destination, based on the communication state. The first communication unit transmits a notification indicating the initial registration destination to the CPS device. The CPS device includes a memory control unit and a registration processing unit. The memory control unit stores, upon receiving the notification from the installation device, the initial registration destination included in the notification in a memory unit. The registration processing unit connects to the initial registration destination, to perform initial registration of the CPS device.

7 Claims, 15 Drawing Sheets

(56) References Cited

FOREIGN PATENT DOCUMENTS

WO     WO 2020/076557 A1     4/2020

OTHER PUBLICATIONS

FIDO Alliance, "FIDO Device Onboard Specification, Proposed Standard," https://fidoalliance.org/specs/FDO/fido-device-onboard-v1.0-ps-20210323, 123 pages (Mar. 23, 2021).
Japan Patent Office, Office Action in JP App. No. 2021-165400, 2 pages, and machine translation, 4 pages (Dec. 24, 2024).

\* cited by examiner

INFORMATION PROCESSING SYSTEM, INSTALLATION DEVICE, AND COMPUTER PROGRAM PRODUCT

CROSS-REFERENCE TO RELATED APPLICATIONS

This application is based upon and claims the benefit of priority from Japanese Patent Application No. 2021-165400, filed on Oct. 7, 2021; the entire contents of which are incorporated herein by reference.

FIELD

Embodiments described herein relate generally to an information processing system, an installation device, and a computer program product.

BACKGROUND

Various services are being achieved through cyber physical systems (CPS) in which CPS devices such as sensors and CPS servers in data centers and the like are linked. In order to operate the CPS securely, servers and devices authenticate each other before communication is performed. For this reason, an initial registration operation is required to register the devices to be allowed to connect with the servers.

DETAILED DESCRIPTION

Figure 1:
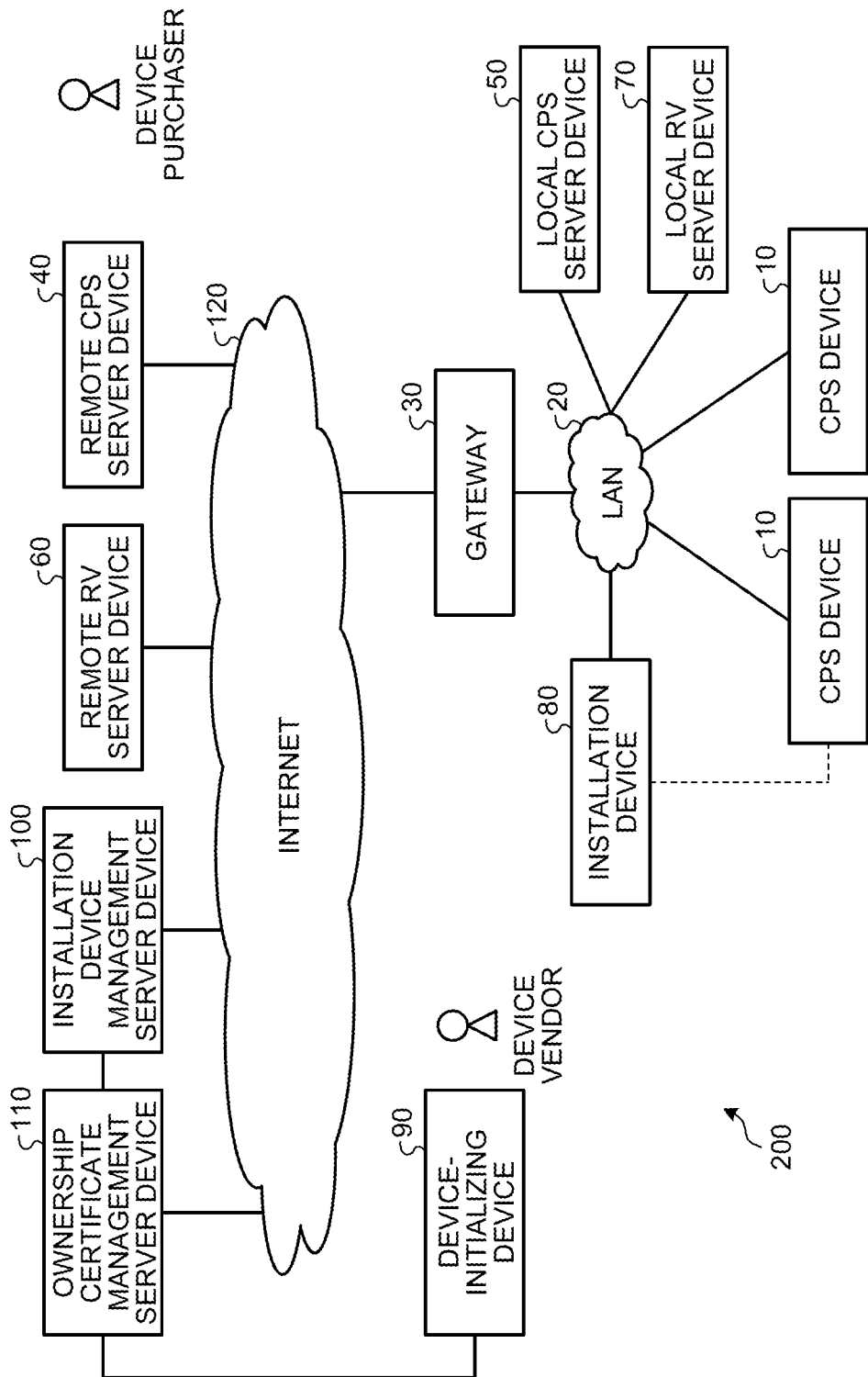
FIG. 1 is a diagram illustrating an example of a device configuration of an information processing system according to a first embodiment.

According to an embodiment, an information processing system includes an installation device and a cyber physical system (CPS) device. The installation device includes a detection unit, a determination unit, and a first communication unit. The detection unit detects a communication state of a first network to which a first CPS server device is connected. The determination unit determines the first CPS server device or a second CPS server device as an initial registration destination, based on the communication state. The first communication unit transmits a notification indicating the initial registration destination to the CPS device. The CPS device includes a memory control unit and a registration processing unit. The memory control unit stores, upon receiving the notification from the installation device, the initial registration destination included in the notification in a memory unit. The registration processing unit connects to the initial registration destination, to perform initial registration of the CPS device.

Hereinbelow, embodiments of an information processing system, an installation device 80, and a computer program product are described in detail with reference to the accompanying drawings.

In order to increase the fault tolerance of CPS, a configuration with a plurality of servers in different locations could be considered. For example, a server is installed on each of the Internet and LAN. In an ordinary condition, devices are managed by a server on the Internet. In the event of a disaster or other unusual event that a connection to the Internet is cut off, the devices are managed by a server on the LAN. According to this, services are continuously provided even in an abnormal condition.

The FIDO Device Onboard standard is known as a technology that automates an initial registration operation of a device (FIDO Device Onboard Specification, [online], [search on Sep. 17, 2021], Internet <URL: https://fidoalliance.org/specs/FDO/fido-device-onboard-v1.0-ps-20210323/>). In this standard, a server called a rendezvous server is an intermediary. A CPS device is shipped in a state in which an address of the rendezvous server is written therein in advance. The CPS server registers itself as the owner of the device with the rendezvous server. In a case where the CPS device starts to operate, the CPS device is connected to the rendezvous server and acquires an address of the CPS server to be connected with the CPS device from the rendezvous server. The CPS device itself is then connected to the CPS server to perform the initial registration operation. However, with this method, in a case where the rendezvous server is on the Internet, a device cannot be connected to the rendezvous server in the abnormal condition. In a case where the rendezvous server is on LAN, an address or host name thereof generally varies depending on the LAN where the server is installed. Therefore, the address or host name cannot be written into the CPS device in advance.

First Embodiment

First, an example of a device configuration of an information processing system 200 according to a first embodiment will be described.
Example of Device Configuration
FIG. 1 is a diagram illustrating the example of the device configuration of the information processing system 200 according to the first embodiment.

In the first embodiment, a case where a device vendor vends a CPS device 10 to a device purchaser will be described.

The device purchaser initially registers the purchased CPS device 10 with a remote CPS server device 40 or a local CPS server device 50 managed by itself. After the initial registration is completed, the CPS device 10 and the remote CPS server device 60 or the local CPS server device 50 communicate with each other to perform expected functions as a system.

The information processing system 200 in FIG. 1 includes a device owned (managed) by the device vendor and a device owned by the device purchaser.

The information processing system 200 according to the first embodiment is provided with a CPS device 10, a local area network (LAN) 20, a gateway 30, the remote CPS server device 40, the local CPS server device 50, a remote rendezvous (RV) server device 60, a local RV server device 70, the installation device 80, a device-initializing device 90, an installation device management server device 100, an ownership certificate management server device 110, and an Internet 120.

The CPS device 10, the gateway 30, the local CPS server device 50, the local RV server device 70 (second rendezvous server device), and the installation device 80 are connected via the LAN 20 (second network).

The remote CPS server device 40, the remote RV server device 60 (first rendezvous server device), the device-initializing device 90, the installation device management server device 100, and the ownership certificate management server device 110 are connected via the Internet 120 (first network).

The Internet 120 is an example of a network to which the remote RV server device 60, the device-initializing device 90, the installation device management server device 100, and the ownership certificate management server device 110 are connected. The remote RV server device 60, the device-initializing device 90, the installation device management server device 100, and the ownership certificate management server device 110 may be connected to any network other than the Internet 120.

Each device will be described below.

The CPS device 10 is a device that constitutes a CPS (for example, an Internet of Things (IoT) device). Initially, the device vendor owns the CPS device 10, but the device vendor passes ownership to the device purchaser through a purchase agreement. The device purchaser installs the CPS device 10 at a desired location, and the CPS device 10 is connected to the LAN 20. The CPS device 10 is managed by the local CPS server device 50 or the remote CPS server device 60.

The LAN 20 is a local area network available to the device purchaser. The LAN 20 may be wired or wireless, or both wired and wireless may be combined to implement the LAN 20.

The gateway 30 is a device used for a connection to the Internet 120 via the LAN 20. Devices owned by the device purchaser (for example, the CPS device 10, and the like) are connected to the Internet via the gateway 30.

The remote CPS server device 40 is a server device managed by the device purchaser. The remote CPS server device 40 communicates with the CPS device 10 via the Internet 120 and performs predetermined functions.

The local CPS server device 50 is a server device managed by the device purchaser. The local CPS server device 50 is connected to the LAN 20. The local CPS server device 50 provides the same services as that provided by the remote CPS server device 40 or complements the functions of the remote CPS server device 40. In particular, during an abnormal condition in which communication to the Internet 120 via the LAN 20 is cut off, the local CPS server device 50 communicates with the CPS device 10 instead of the remote CPS server device 40 and performs the predetermined functions.

The remote RV server device 60 is a rendezvous server device installed on the Internet 120. The remote RV server device 60 may be managed by the device vendor or the device purchaser, or may be managed by a third party. The remote RV server device 60 communicates with each of the remote CPS server device 40 and the CPS device 10. The CPS device 10 acquires an address of the remote CPS server device 40 for initial registration from the remote RV server device 60.

The local RV server device 70 is a rendezvous server device installed on the LAN 20. The local RV server device 70 is managed by the device purchaser. A role of the local RV server device 70 is basically the same as the remote RV server device 60, but the local RV server device 70 communicates with the local CPS server device 50 and the CPS device 10.

The installation device 80 is a device that supports an initial registration operation in a case where the device purchaser installs the CPS device to perform the initial registration operation. The installation device 80 is, for example, an application running on a smartphone owned by the device purchaser. The installation device 80 is connected to the LAN 20. Address information of the local CPS server device 50, the local RV server device 70, and the like on the LAN 20 is set in the installation device 80 by the device purchaser. The installation device 80 is connected to the Internet 120 via the LAN 20. The installation device 80 also has a function to be connected to and communicate with the CPS device 10 directly.

The device-initializing device 90 is a device that initializes the CPS device 10. The device-initializing device 90 is managed by the device vendor. The device vendor initializes the CPS device 10 by the device-initializing device 90 before shipping the CPS device 10.

The installation device management server device 100 is a server device that manages the installation device 80 via the Internet 120. The installation device management server device 100 is managed by the device vendor.

The ownership certificate management server device 110 is a server device that manages an ownership certificate that is a digital document for proving an owner of the CPS device 10. The ownership certificate management server device 110 is managed by the device vendor.

First, herein, the ownership certificate will be described. The ownership certificate is a digital document that indicates a right owner of the CPS device 10. The ownership certificate is first issued by the device-initializing device 90. The ownership certificate immediately after issuance includes the following information An identifier of the CPS device 10

A hash value of X.509 certificate of the CPS device 10

A public key of the ownership certificate management server device 110

A message authentication code (MAC) for the above described information (identifier, hash value, and public key), which is assigned by the CPS device 10

X.509 certificate for the CPS device 10

In a case where the device vendor vends the CPS device 10 to the device purchaser, an ownership certificate for authenticating that fact is issued. Specifically, the ownership certificate management server device 110 issues an ownership certificate with at least the following information added to the above described ownership certificate A public key of the CPS server of the device purchaser A digital signature for the above described public key, which is applied by the ownership certificate management server device 110

The ownership certificate issued in this manner is stored in the remote CPS server device 40 or the local CPS server device 50.

The ownership certificate is used for mutual authentication in a case where the CPS device 10 initially registers the CPS device 10 with the remote CPS server device 40 or the local CPS server device 50.

The remote CPS server device 40 or the local CPS server device 50 provides an ownership certificate to the CPS device 10 to present the fact that the remote CPS server device 40 or the local CPS server device 50 is a right owner of the CPS device.

The CPS device 10 verifies each of the message authentication code and the digital signature in the ownership certificate, thereby verifying legitimacy of the ownership certificate. After verification, the CPS device 10 acquires a public key of the remote CPS server device 40 or the local CPS server device 50 from the ownership certificate and authenticates the remote CPS server device 40 or the local CPS server device 50 with the public key. On the other hand, the remote CPS server device 40 or the local CPS server device 50 authenticates the CPS device 10 by using X.509 certificate included in the ownership certificate.

As described above, the remote CPS server device 40 or local CPS server device 50 and the CPS device 10 perform mutual authentication before starting an initial registration process.

Example of Functional Configuration of Each Device

Figure 2:
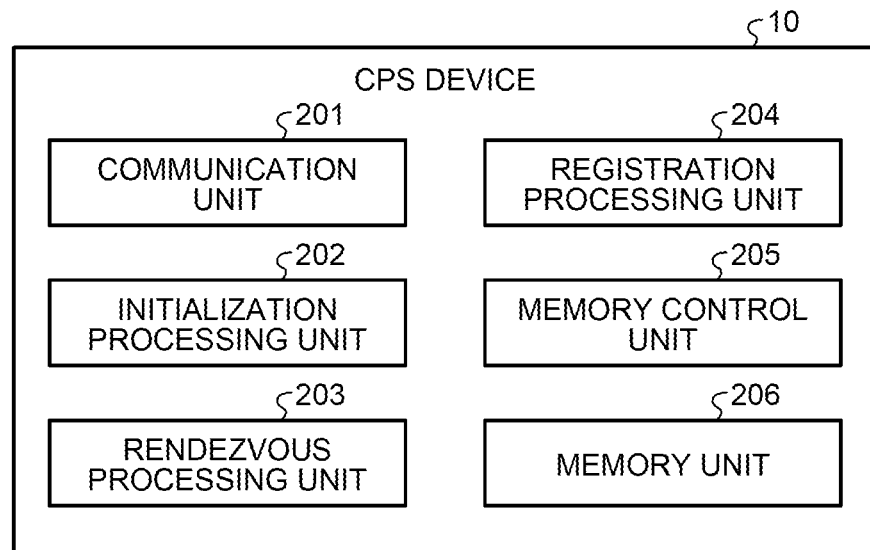
FIG. 2 is a diagram illustrating an example of a functional configuration of a CPS device according to the first embodiment.

FIG. 2 is a diagram illustrating an example of a functional configuration of the CPS device 10 according to the first embodiment. The CPS device 10 according to the first embodiment includes a communication unit 201, an initialization processing unit 202, a rendezvous processing unit 203, a registration processing unit 204, a memory control unit 205, and a memory unit 206.

The communication unit 201 communicates with other devices by using the wired LAN, the wireless LAN, and the near field communication standard. For example, the communication unit 201 communicates with other devices via the LAN 20. In addition, for example, the communication unit 201 communicates with the installation device 80. Any method of communicating with the installation device 80 may be adopted. For example, the communication unit 201 communicates with the device-initializing device 90 during initialization of the CPS device 10. The initialization of the CPS device 10 is performed before the CPS device 10 is shipped by, for example, the device vendor. Any method of communicating with the device-initializing device 90 may be adopted.

The initialization processing unit 202 communicates with the device-initializing device 90 through the communication unit 201 to perform an initializing process.

The rendezvous processing unit 203 transmits an initial registration destination request to make a query about an initial registration destination to the installation device 80 and acquires initial registration destination information from the installation device 80. The rendezvous processing unit 203 then stores the initial registration destination information in the memory unit 206 by the memory control unit 205.

The registration processing unit 204 reads out the initial registration destination information stored in the memory unit 206, is connected to an initial registration destination (remote CPS server device 40 or local CPS server device 50) based on the initial registration destination information, and performs initial registration.

The memory control unit 205 performs memory control for information stored in the memory unit 206.

The memory unit 206 stores information. For example, the memory unit 206 stores a key pair (signature key and public key) for signing. The public key of this key pair is included in the ownership certificate in the form of X.509 certificate. For example, the memory unit 206 also stores a private key for generating the message authentication code to be assigned to the ownership certificate. This private key is newly generated during device initialization. For example, the memory unit 206 also stores a unique identifier of the CPS device 10. This unique identifier is written into the CPS device 10 during device initialization. For example, the memory unit 206 also stores an address of a rendezvous server to which the CPS device 10 is connected. In the first embodiment, this address is an address of the installation device 80, and the address of the installation device 80 is written during device initialization. For example, the memory unit 206 also stores information received from the installation device 80 (for example, authentication information for the LAN 20 and initial registration destination information). For example, the memory unit 206 also stores a CPS key used for authentication in a case where the CPS device 10 is connected to the CPS server in which initial registration has been completed. For example, the memory unit 206 also stores an address of the CPS server in which initial registration has been completed (remote CPS server device 40 or local CPS server device 50) and information such as a server certificate of the CPS server. In a case where the memory unit 206 receives notification of an alternative CPS server from the CPS server, the memory unit 206 stores the same information about the alternative CPS server as that of the CPS server.

Figure 3:
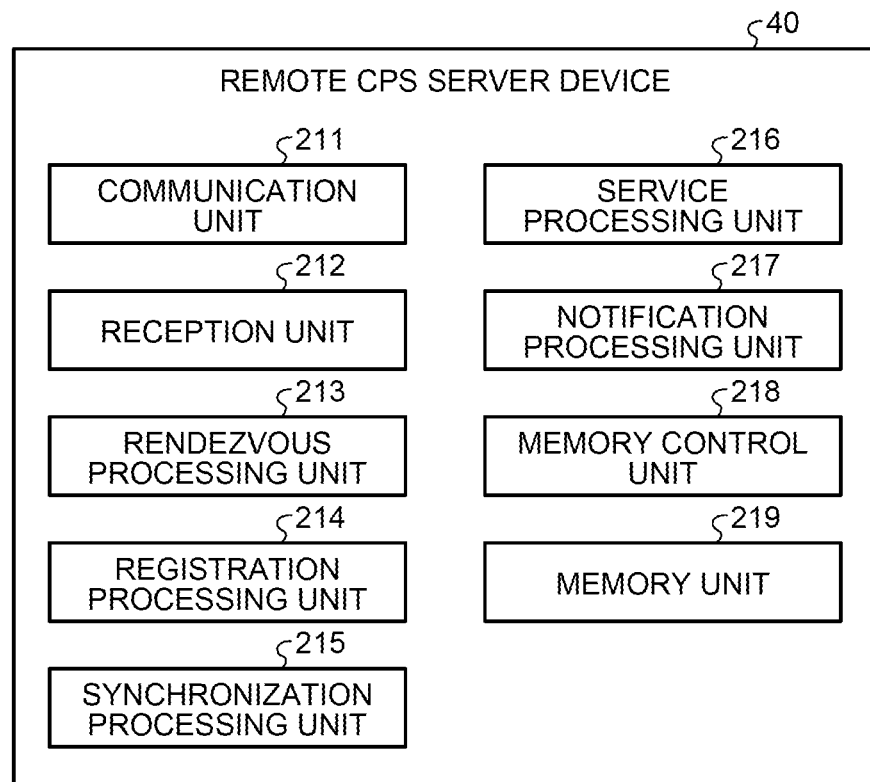
FIG. 3 is a diagram illustrating an example of a functional configuration of a remote CPS server device according to the first embodiment.

FIG. 3 is a diagram illustrating an example of a functional configuration of the remote CPS server device 40 according to the first embodiment. The remote CPS server device 40 according to the first embodiment includes a communication unit 211, a reception unit 212, a rendezvous processing unit 213, a registration processing unit 214, a synchronization processing unit 215, a service processing unit 216, a notification processing unit 217, a memory control unit 218, and a memory unit 219.

The communication unit 211 communicates with other devices via the Internet 120 or the LAN 20. For example, the communication unit 211 transmits an address of the local CPS server device 50 to the CPS device 10 as information on an alternative CPS server for the remote CPS server device 40.

The reception unit 212 provides a public key for signing to the ownership certificate management server device 110, the installation device 80, or the like, and receives an issuance of an ownership certificate from the ownership certificate management server device 110, the installation device 80, or the like. The ownership certificate is stored in the memory unit 219.

The rendezvous processing unit 213 registers the initial registration destination information with the remote RV server device 60 or the local RV server device 70.

The registration processing unit 214 communicates with the CPS device 10 through the communication unit 211 to perform the initial registration of the CPS device 10.

The synchronization processing unit 215 synchronizes the information on the CPS device 10 stored in the memory unit 219 (information on the CPS device 10 of which initial registration has been completed) with the local CPS server device 50.

The service processing unit 216 communicates with the CPS device 10 of which initial registration has been completed to perform services as a CPS. For example, the service processing unit 216 stores sensor data and the like uploaded from the CPS device 10 in the memory unit 218 by the memory control unit 218 or transmits a control command to the CPS device 10.

The notification processing unit 217 notifies the CPS device 10 of address information for accessing the alternative local CPS server device 50.

The memory control unit 218 performs memory control for information stored in the memory unit 219.

The memory unit 219 stores information. For example, the memory unit 219 stores a key pair for signing. The public key of this key pair is written in the ownership certificate. For example, the memory unit 219 also stores the ownership certificate. For example, the memory unit 219 also stores information (for example, an identifier of the CPS device 10 and a public key of a CPS key corresponding to the identifier) on the CPS device 10 of which initial registration has been completed in the remote CPS server device 40 or the local CPS server device 50.

Figure 4:
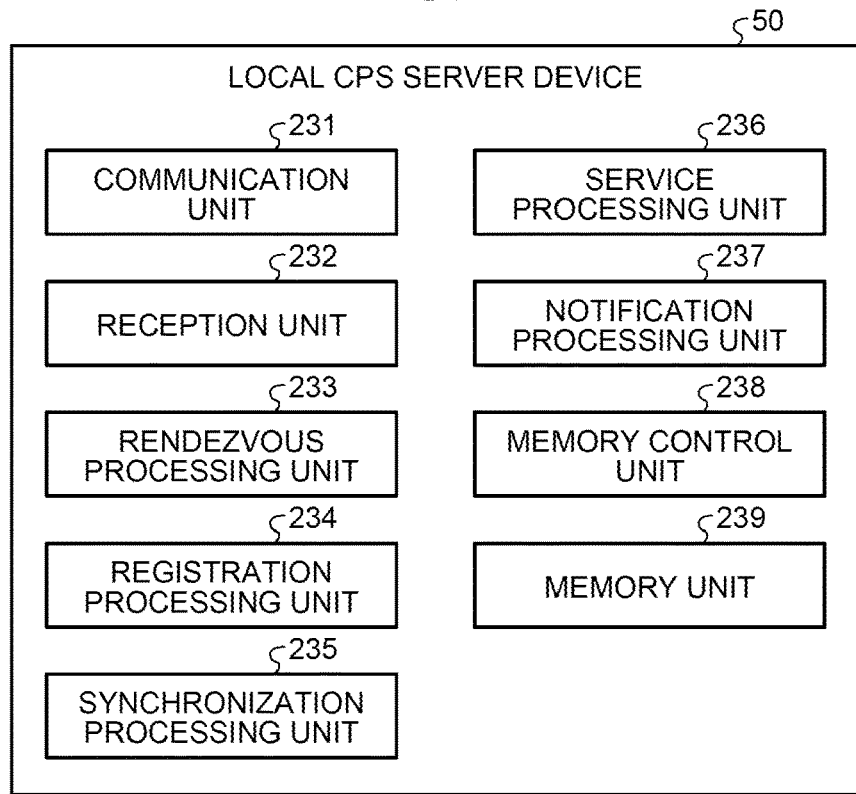
FIG. 4 is a diagram illustrating an example of a functional configuration of a local CPS server device according to the first embodiment.

FIG. 4 is a diagram illustrating an example of a functional configuration of the local CPS server device 50 according to the first embodiment. The local CPS server device 50 according to the first embodiment includes a communication unit 231, a reception unit 232, a rendezvous processing unit 233, a registration processing unit 234, a synchronization processing unit 235, a service processing unit 236, a notification processing unit 237, a memory control unit 238, and a memory unit 239.

Since operations of the reception unit 232, the rendezvous processing unit 233, the registration processing unit 234, the service processing unit 236, the notification processing unit 237, the memory control unit 238, and the memory unit 239 are the same as that of the reception unit 212, the rendezvous processing unit 213, the registration processing unit 214, the service processing unit 216, the notification processing unit 217, the memory control unit 218, and the memory unit 219 (see FIG. 3), the descriptions will not be repeated.

The communication unit 231 communicates with other devices via the Internet 120 or the LAN 20. For example, the communication unit 231 transmits an address of the remote CPS server device 40 to the CPS device 10 as information on an alternative CPS server for the local CPS server device 50.

The synchronization processing unit 235 synchronizes the information on the CPS device 10, which is stored in the memory unit 239 (information on the CPS device 10 of which initial registration has been completed) with the remote CPS server device 40 after a connection to the Internet 120 is recovered.

Figure 5:
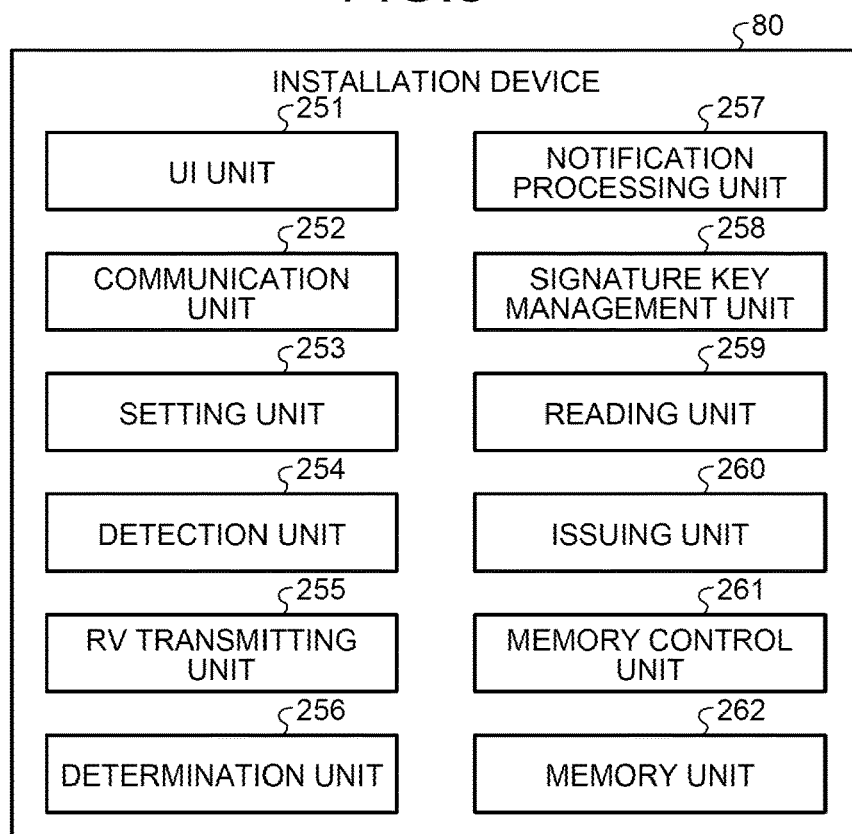
FIG. 5 is a diagram illustrating an example of a functional configuration of an installation device according to the first embodiment.

FIG. 5 is a diagram illustrating an example of a functional configuration of the installation device 80 according to the first embodiment. The installation device 80 according to the first embodiment includes a user interface (UI) unit 251, a communication unit 252, a setting unit 253, a detection unit 254, an RV transmitting unit 255, a determination unit 256, a notification processing unit 257, a signature key management unit 258, a reading unit 259, an issuing unit 260, a memory control unit 261, and a memory unit 262.

The UI unit 251 receives an operation from a user and provides information in response to the operation. For example, in a case where the installation device 80 is a smart device such as a smartphone, the UI unit 251 is a touch screen or the like.

The communication unit 252 communicates with other devices by using the wired LAN, the wireless LAN, and the near field communication standard. For example, the communication unit 252 transmits a notification including an address of the remote CPS server device 40 or the local CPS server device 50 to the CPS device 10. For example, the communication unit 252 also performs the above-described mutual authentication with the CPS device 10 by using the above-described ownership certificate.

The setting unit 253 communicates with the CPS device 10 through the communication unit 252 to set authentication information on the LAN 20. Specifically, in a case where the mutual authentication with the CPS device 10 is successful, the setting unit 253 sets, to the CPS device 10, authentication information for connecting the CPS device 10 to the LAN 20.

The detection unit 254 detects a communication state of the LAN 20 and the Internet 120. The communication state of the Internet 120 is used to, for example, determine whether a connection to the remote RV server device 60 is available.

In a case of receiving an initial registration destination request from the CPS device 10, the RV transmitting unit 255 transmits the initial registration destination request to the remote RV server device 60 or the local RV server device 70. A transmitting destination is appropriately selected according to the results of detecting the communication state by the detection unit 254.

The determination unit 256 identifies, based on the response to the initial registration destination request, an address of the remote CPS server device 40 or the local CPS server device 50 and determines a connection to the remote CPS server device 40 or the local CPS server device 50. In the first embodiment, the determination unit 256 determines the remote CPS server device 40 as the initial registration destination in a case where communication failure to the Internet 120 does not occur, and determines the local CPS server device 50 as the initial registration destination in a case where communication failure to the Internet 120 occurs.

The notification processing unit 257 transmits the initial registration destination information received from the remote RV server device 60 or the local RV server device 70 to the CPS device 10.

The signature key management unit 258 communicates with the installation device management server device 100 and manages a signature key by uploading, downloading, and updating the signature key.

The reading unit 259 reads out the ownership certificate from a physical medium. The physical medium is, for example, microSD card, QR code (registered trademark), or the like.

The issuing unit 260 communicates with the remote CPS server device 40 or the local CPS server device 50 and issues an ownership certificate indicating that ownership of the CPS device has been transferred to the remote CPS server device 40 or the local CPS server device 50.

The memory control unit 261 performs memory control for information stored in the memory unit 262.

The memory unit 262 stores information. For example, the memory unit 262 stores authentication information for the LAN 20. The authentication information for the LAN 20 is received with, for example, an operation input by the user through the UI unit 251. For example, the memory unit 262 also stores addresses of the remote RV server device 60 and the local RV server device 70. These addresses are received with, for example, an operation input by the user through the UI unit 251. For example, the memory unit 262 also stores a key pair for signing. A public key of this key pair is subjected to centralized management performed by the installation device management server device 100 and is written in the ownership certificate. For example, the memory unit 262 also stores the ownership certificate read by the reading unit 259.

Figure 6:
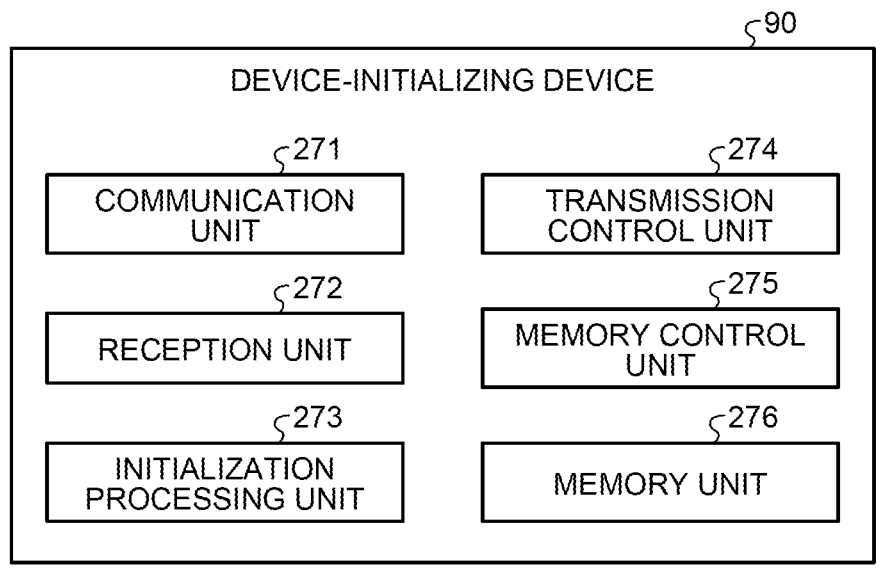
FIG. 6 is a diagram illustrating an example of a functional configuration of a device-initializing device according to the first embodiment.

FIG. 6 is a diagram illustrating an example of a functional configuration of the device-initializing device 90 according to the first embodiment. The device-initializing device 90 according to the first embodiment includes a communication unit 271, a reception unit 272, an initialization processing unit 273, a transmission control unit 274, a memory control unit 275, and a memory unit 276.

The communication unit 271 communicates with the CPS device 10 subjected to initialization.

The reception unit 272 communicates with the ownership certificate management server device 110 through the communication unit 271 and receives a public key of a signature key from the ownership certificate management server device 110.

The initialization processing unit 273 initializes the CPS device 10 and issues an ownership certificate for granting the ownership certificate management server device 110 ownership of the CPS device 10.

The transmission control unit 274 transmits the ownership certificate issued by the initialization processing unit 273 to the ownership certificate management server device 110.

The memory control unit 275 performs memory control for information stored in the memory unit 276.

The memory unit 276 stores information. For example, the memory unit 276 stores a public key received from the ownership certificate management server device 110.

Figure 7:
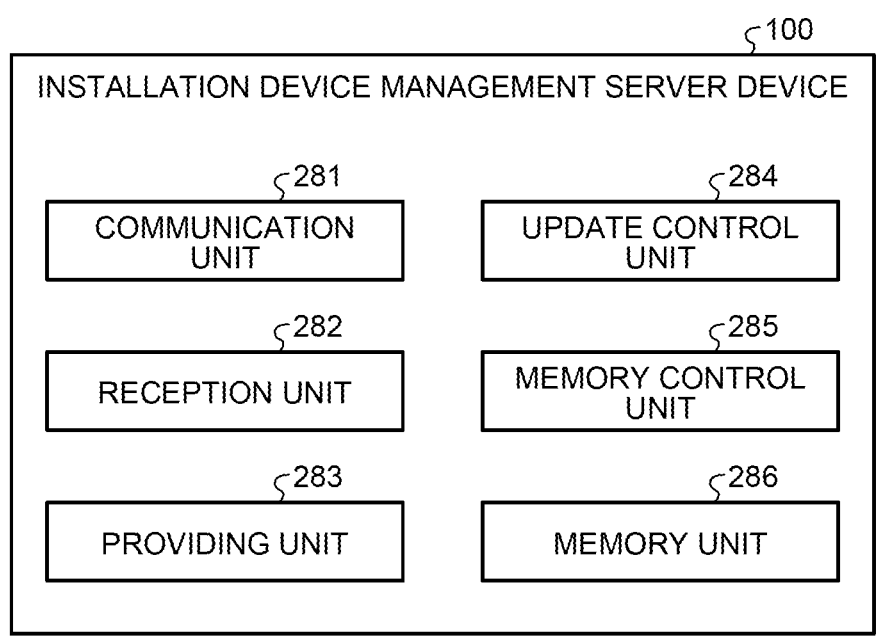
FIG. 7 is a diagram illustrating an example of a functional configuration of an installation device management server device according to the first embodiment.

FIG. 7 is a diagram illustrating an example of a functional configuration of the installation device management server device 100 according to the first embodiment. The installation device management server device 100 according to the first embodiment includes a communication unit 281, a reception unit 282, a providing unit 283, an update control unit 284, a memory control unit 285, and a memory unit 286.

The communication unit 281 communicates with other devices via a network such as the Internet 120.

In a case of receiving a public key of the installation device 80 from the installation device 80 through the communication unit 281, the reception unit 282 stores the public key in the memory unit 286 through the memory control unit 285.

The providing unit 283 provides the public key of the installation device 80 to the ownership certificate management server device 110.

The update control unit 284 controls an updating process of a signature key of the installation device 80.

The memory control unit 285 performs memory control for information stored in the memory unit 286.

The memory unit 286 stores information. For example, the memory unit 286 stores information on an identifier of the installation device 80 and a public key corresponding to the identifier.

Figure 8:
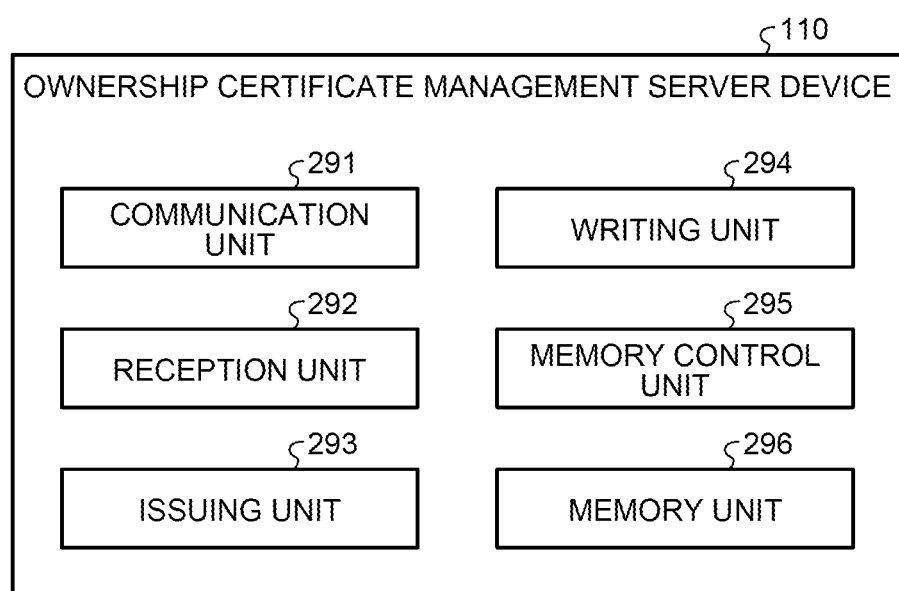
FIG. 8 is a diagram illustrating an example of a functional configuration of an ownership certificate management server device according to the first embodiment.

FIG. 8 is a diagram illustrating an example of a functional configuration of the ownership certificate management server device 110 according to the first embodiment. The ownership certificate management server device 110 according to the first embodiment includes a communication unit 291, a reception unit 292, an issuing unit 293, a writing unit 294, a memory control unit 295, and a memory unit 296.

The communication unit 291 communicates with other devices via a network such as the Internet 120.

In a case of receiving an ownership certificate issued by the device-initializing device 90 through the communication unit 291, the reception unit 292 stores the ownership certificate in the memory unit 296.

The issuing unit 293 communicates with the remote CPS server device 40 and issues an ownership certificate indicating that ownership of the CPS device 10 is transferred to the remote CPS server device 40. The issuing unit 293 communicates with the installation device management server device 100 and issues an ownership certificate indicating that ownership of the CPS device 10 has been transferred to the installation device 80.

The writing unit 294 writes the ownership certificate into a physical medium. The physical medium is, for example, microSD card, QR code (registered trademark), or the like.

The memory control unit 295 performs memory control for information stored in the memory unit 296.

The memory unit 296 stores information. For example, the memory unit 296 stores a key pair for signing. The public key of this key pair is provided to the device-initializing device 90 and is also written in the ownership certificate. For example, the memory unit 296 also stores the ownership certificate of the CPS device 10 initialized by the device-initializing device 90.

Example of Initial Registration Process

Figure 9:
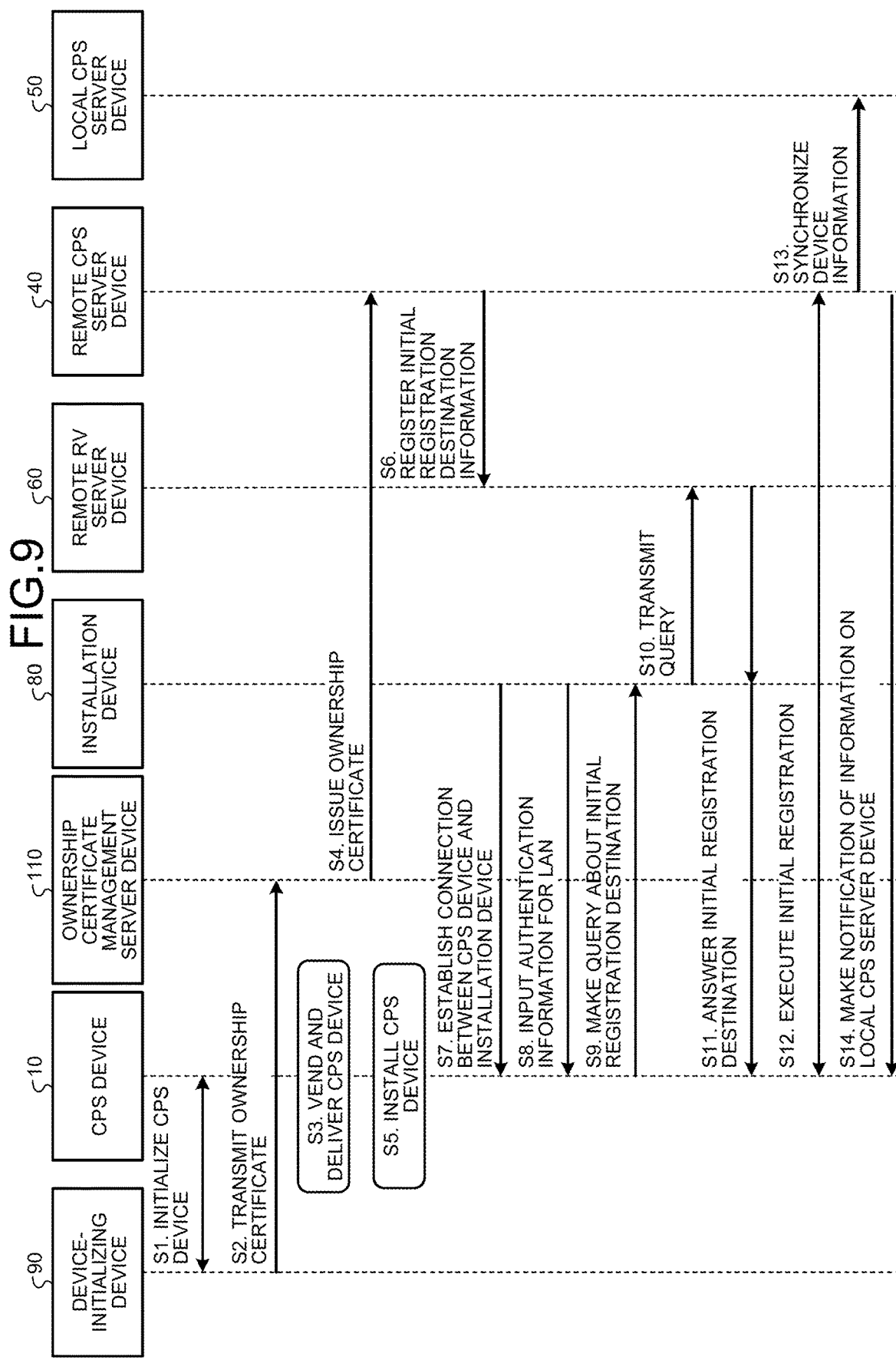
FIG. 9 is a sequence diagram illustrating an example of an initial registration process (normal condition) according to the first embodiment.

FIG. 9 is a sequence diagram illustrating an example of an initial registration process (normal condition) according to the first embodiment. FIG. 9 is a diagram illustrating an example of a flow in a case where the initial registration of the CPS device 10 is performed during a normal condition in which communication with the Internet 120 is possible without delay. At the start of this flow, the CPS device 10 is owned by the device vendor.

First, the device-initializing device 90 initializes the CPS device 10 in response to an operation input by the device vendor (step S1). By performing the process at step S1, a unique device identifier is written into the CPS device 10. The address of the installation device 80 is also written as a rendezvous server to which the CPS device 10 is connected. As described later, since the installation device 80 and the CPS device 10 are directly connected and communicate with each other, a fixed address, independent of the LAN 20 at an installation destination, can be written as the address of the installation device 80. In this initializing process, the device-initializing device 90 also issues the above-described ownership certificate.

Next, the device-initializing device 90 transmits the ownership certificate issued in the initializing process at step S1 to the ownership certificate management server device 110 (step S2). The ownership certificate management server device 110 stores the ownership certificate.

Next, the device vendor vends the CPS device 10 to the device purchaser, and the CPS device 10 is delivered to the device purchaser (step S3). In this case, the device vendor receives an address and a public key of the remote CPS server device 40 from the device purchaser.

Next, the ownership certificate management server device 110 receives an input indicating the address and the public key of the remote CPS server device 40 from the device vendor. Based on the input, the ownership certificate management server device 110 communicates with the remote CPS server device 40 to confirm that the public key belongs to the remote CPS server device 40. Upon confirmation, the ownership certificate management server device 110 issues an ownership certificate indicating that control of the CPS device 10 is transferred to the remote CPS server device 40 (step S4) and transmits the ownership certificate to the remote CPS server device 40. The remote CPS server device 40 stores the ownership certificate that has been received from the ownership certificate management server device 110.

Next, the CPS device 10 is installed by the device purchaser (step S5), and the device purchaser turns the CPS device 10 on.

Next, the remote CPS server device 40 registers the initial registration destination information with the remote RV server device 60 (step S6). Specifically, the remote CPS server device 40 transmits a combination of the device identifier of the CPS device and the address of the remote CPS server device 40 to the remote RV server device 60. The remote RV server device 60 then stores the combination of the device identifier of the CPS device and the address of the remote CPS server device 40.

Next, the installation device 80 establishes a connection between the CPS device 10 and the installation device 80 in response to an operation by the device purchaser (step S7). In the process at step S7, the connection is established by, for example, the wireless LAN, Bluetooth (registered trademark), or the like. The device starting the connection process may be the CPS device 10 or the installation device 80.

Next, the installation device 80 inputs authentication information for the LAN 20 into the CPS device 10 (step S8). The authentication information for the LAN 20 is information used by the CPS device 10 to access the LAN 20. For example, in a case where the LAN 20 is a wireless LAN, the authentication information for the LAN 20 is a combination of a SSID and a password for the wireless LAN 20. For example, the authentication information for the LAN 20 may be input according to the WiFi Easy Connect standard. In that case, the installation device 80 serves as Configurator, and the CPS device 10 serves as Enrollee.

Next, the CPS device 10 regards the installation device 80 as a rendezvous server and makes a query about the address of the CPS server (remote CPS server device 40 or local CPS server device 50) to be the initial registration destination (step S9). In this case, the CPS device 10 allows its own device identifier to be included in a query request message (initial registration destination request).

Next, in a case of receiving a query (initial registration destination request) from the CPS device 10, the installation device 80 transmits the initial registration destination request to an appropriate rendezvous server according to a communication state (step S10). The addresses of the remote RV server device 60 and the local RV server device 70 are set in advance in the installation device 80 by, for example, the device purchaser. In a case of the normal condition, the installation device 80 transmits a query (initial registration destination request) to the remote RV server device 60.

Next, in a case of receiving the initial registration destination request, the remote RV server device 60 searches for an initial registration destination address corresponding to the device identifier included in the initial registration destination request and returns a search result. The installation device 80 answers, to the CPS device 10, the initial registration destination based on the search result (step S11).

Next, in a case of receiving the address indicating the initial registration destination, the CPS device 10 is connected to the address (in the example in FIG. 9, the address of the remote CPS server device 40) via the LAN 20 and the Internet 120 to execute the initial registration process (step S12).

As described above, in the initial registration process, first, mutual authentication of the CPS device 10 and the CPS server (in the example in FIG. 9, the remote CPS server device 40) is carried out through the ownership certificate. Once mutual authentication is complete, the CPS device 10 generates a CPS key that is a key pair unique to this CPS, and transmits a public key thereof to the CPS server. The CPS server stores this public key. The CPS server also transmits information such as its own address and X.509 certificate to the CPS device 10, and the CPS device 10 stores the information. After this initial registration, the CPS server can authenticate the CPS device 10 by using the CPS key.

Next, the remote CPS server device 40 transmits the device information (specifically, the public key of the CPS key) on the CPS device 10, which is newly stored at step S12, to the local CPS server device 50. In this way, the device information of the CPS device 10 of which initial registration has been completed is synchronized between the remote CPS server device 40 and the local CPS server device 50 (step S13).

Next, the remote CPS server device 40 notifies the CPS device 10 of information (such as address) on the local CPS server device 50 (step S14). The CPS device 10 stores the information.

With the above described flow, the CPS device 10 is initially registered with the remote CPS server device 40.

Figure 10:
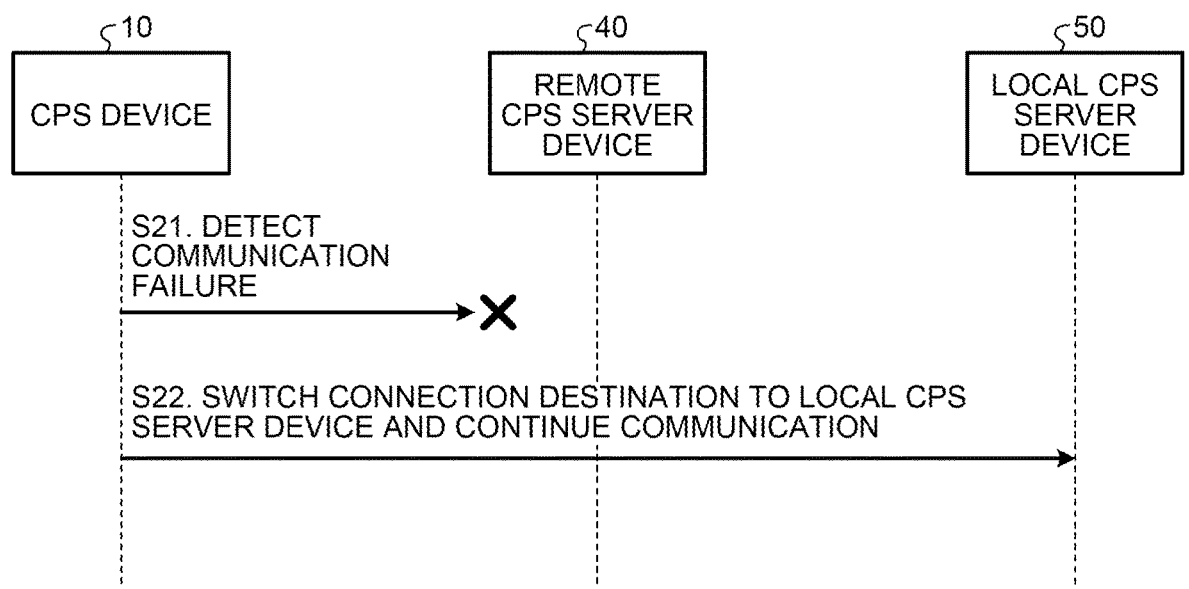
FIG. 10 is a sequence diagram illustrating an example of a process that transitions from a normal condition to an abnormal condition according to the first embodiment.

FIG. 10 is a sequence diagram illustrating an example of a process that transitions from a normal condition to an abnormal condition according to the first embodiment. FIG. 10 is a sequence diagram illustrating an example of a processing flow to be performed in a case where communication with the Internet 120 is lost after the initial registration is completed in the normal condition.

First, the CPS device 10 constantly performs a communicate process with the remote CPS server device 40 as a part of a CPS function, and detects that communication with the Internet 120 has been lost due to a failure of this communication process (step S21).

Next, the CPS device 10 switches a connection destination to the address of the local CPS server device 40 notified in the process at step S14 of the initial registration flow in FIG. 9, and continues communication (step S22).

Figure 11:
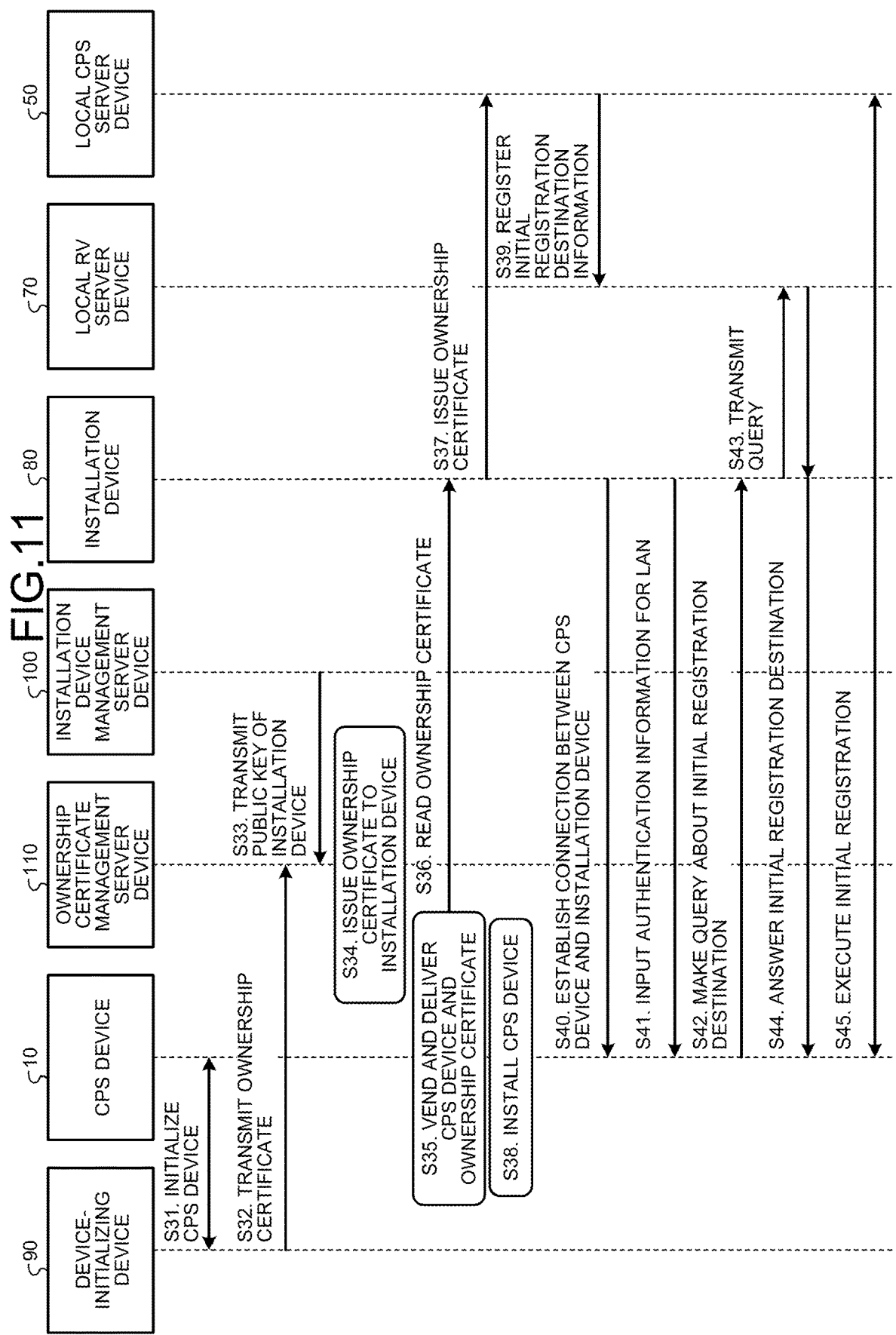
FIG. 11 is a sequence diagram illustrating an example of an initial registration process (abnormal condition) according to the first embodiment.

FIG. 11 is a sequence diagram illustrating an example of an initial registration process (abnormal condition) according to the first embodiment. FIG. 11 is a sequence diagram illustrating an example of a flow of initial registration of the CPS device 10 in an abnormal condition in which communication with the Internet 120 is cut off.

It is assumed that one installation device 80 holds a key pair for signing. In the normal condition, the installation device management server device 100 communicates with the installation device 80 via the Internet 120 as appropriate, and centrally manages the public key of the installation device 80. The key pair for signing of the installation device 80 may be a unique key (individual key) for each installation device 80, a key (unified key) shared by all installation devices 80, or a unique key (group key) for each specific installation device 80 group. In the following flow, it will be basically assumed that the key pair for signing is a unified key.

The processes at step S31 and step S32 are the same as that of step S1 and step S2 in the normal condition (see FIG. 9).

The processes at step S31 and step S32 can be performed even in a case of the abnormal condition, but may be performed in advance in the normal condition. For example, processes at step S31 and step S32 may be performed when the device vendor purchases the CPS device 10 from an upstream supply chain (for example, device manufacturers and wholesalers).

Next, the installation device management server device 100 transmits the public key of the installation device 80 to the ownership certificate management server device 110 (step S33).

Next, the ownership certificate management server device 110 issues an ownership certificate, indicating that control of the CPS device 10 is transferred, to the public key received from the installation device management server device 100 at step S33 (step S34).

The ownership certificate management server device 110 also writes the ownership certificate into a physical medium. Examples of the physical medium include microSD card, USB memory stick, RFID tag, QR code (registered trademark), and the like. The QR code (registered trademark) is physically displayed on, for example, a seal, a package of the CPS device 10, or the like.

Next, the device vendor vends a combination of the ownership certificate that has been written into the physical medium and the CPS device 10 to the device purchaser, and the combination of the ownership certificate and the CPS device 10 is transferred from the device vendor to the device purchaser (step S35).

Next, the installation device 80 reads out the ownership certificate from the physical medium in response to an operation input by the device purchaser (step S36). As described above, this ownership certificate grants the installation device 80 ownership of the CPS device 10.

Next, the installation device 80 communicates with the local CPS server device 50 via the LAN 20 and issues an ownership certificate indicating that ownership of the CPS device 10 is transferred to the local CPS server device 50 (step S37). This ownership certificate is issued by appending information indicating that the ownership of the CPS device 10 has been further transferred to the local CPS server device 50 to the ownership certificate read out in the process at step S36. Specifically, the ownership certificate issued at step S37 contains the following information An identifier of the CPS device 10

A hash value of X.509 certificate of the CPS device 10

A public key of the ownership certificate management server device 110

A message authentication code for the above described information (identifier, hash value, and public key), which is assigned by the CPS device 10

X.509 certificate for the CPS device

The public key of the installation device 80

A digital signature applied by the ownership certificate management server device 110 for the public key of the installation device 80

The public key of the local CPS server device 50

A digital signature applied by the installation device 80 for the public key of the local CPS server device 50

Next, the CPS device 10 is installed by the device purchaser (step S38), and the device purchaser turns the CPS device 10 on.

Next, the local CPS server device 50 registers the initial registration destination information with the local RV server device 70 (step S39). Specifically, the local CPS server device 50 stores a combination of the device identifier of the CPS device and the address of the local CPS server device 50 in the local RV server device 70.

Next, the installation device 80 establishes a connection between the CPS device and the installation device 80 in response to an operation by the device purchaser (step S40). Step S40 is similar to step S7 in the normal condition (see FIG. 9), but in this flow, the CPS device 10 and the installation device 80 perform mutual authentication by using the ownership certificate of the installation device 80. Specifically, the installation device 80 provides the ownership certificate when the installation device 80 is connected to the CPS device 10. The CPS device 10 verifies the ownership certificate and confirms that the public key written in the ownership certificate is that of the installation device 80, thereby authenticating the installation device 80. The installation device 80 also authenticates the CPS device 10 by using X.509 certificate of the CPS device 10, which is written in the ownership certificate. As a result, mutual authentication between the CPS device 10 and the installation device 80 is achieved.

The processes at step S41 and step S42 are the same processes at step S8 and step S9 in the normal condition (see FIG. 9).

Next, the installation device 80 transmits the query (initial registration destination request) that has been received from the CPS device 10 (step S43). In case of the abnormal condition, the installation device 80 cannot access the remote RV server device 60. Accordingly, the installation device 80 transmits the query (initial registration destination request) to the local RV server device 70.

Next, in a case of receiving the initial registration destination request from the installation device 80, the local RV server device 70 returns the address corresponding to the initial registration destination, that is, in FIG. 11, the address of the local CPS server device 50. The installation device 80 answers, to the CPS device 10, this address as the initial registration destination (step S44).

Next, in a case of receiving the address indicating the initial registration destination, the CPS device 10 accesses the address and performs the initial registration (step S45). The process at step S45 is the same process at step S14 in the normal condition, but in the abnormal condition, the access to the local CPS server device 50 is carried out to perform the initial registration.

Figure 12:
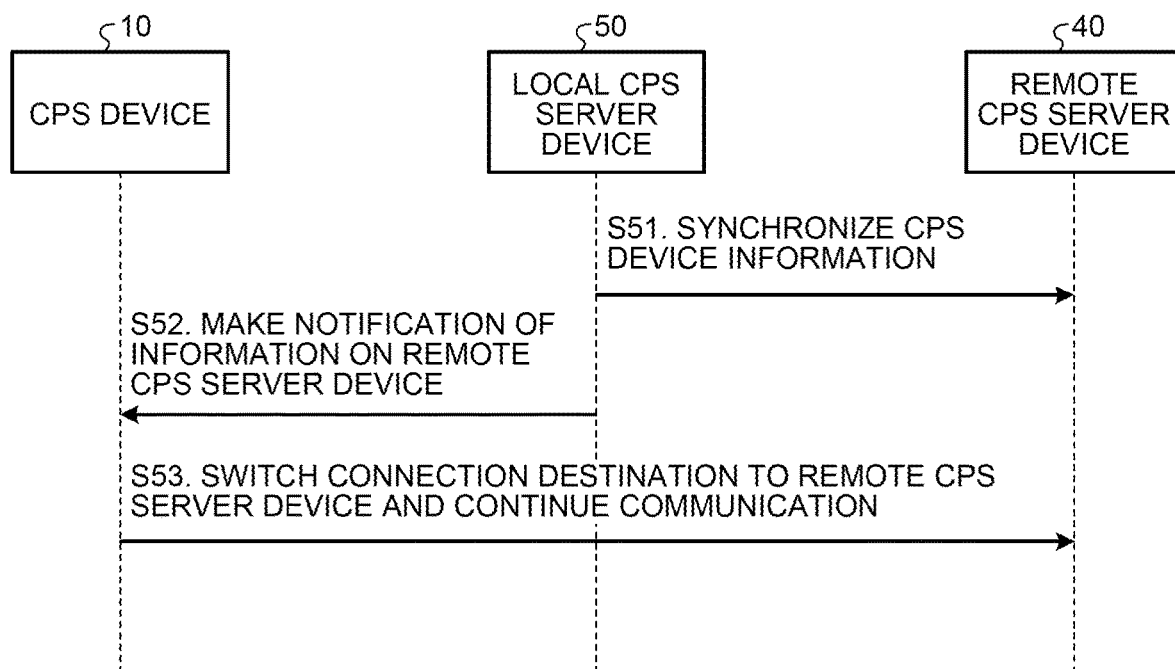
FIG. 12 is a sequence diagram illustrating an example of a process that transitions from abnormal to normal according to the first embodiment.

FIG. 12 is a sequence diagram illustrating an example of a process that transitions from a normal condition to an abnormal condition according to the first embodiment. FIG. 12 is a sequence diagram illustrating an example of a processing flow to be performed in a case where communication with the Internet 120 is recovered after the initial registration is completed in the abnormal condition.

First, the local CPS server device 50 accesses the remote CPS server device 40 and synchronizes device information of the CPS device 10 (step S51). That is, by the synchronization process at step S51, the device information of the CPS device 10, which has been newly registered with the local CPS server device 50, is transmitted to the remote CPS server device 40. As a result, the remote CPS server device 40 can authenticate the CPS device 10.

Next, the local CPS server device 50 notifies the CPS device 10 of information (such as address) on the remote CPS server device 40 (step S52).

Next, the CPS device 10 switches a connection destination to the remote CPS server device 40 and continues communication (step S53).

According to the initial registration flow illustrated in FIGS. 9 and 11, the CPS device 10 can perform initial registration even in the abnormal condition in the same manner as in the normal condition. That is, the CPS device 10 makes a query about the initial registration destination address to the installation device 80, accesses the acquired initial registration destination, and performs the initial registration. The installation device 80 makes a query to the remote RV server device 60 in the case of the normal condition or makes a query to the local RV server device 70 in the case of the abnormal condition to acquire the initial registration destination address and answers to the CPS device 10.

In order to perform the initial registration, the ownership certificate management server device 110 is required to issue the ownership certificate to the CPS server (remote CPS server device 40 or local CPS server device 50). In the normal condition, the ownership certificate management server device 110 issues the ownership certificate directly to the remote CPS server device 40 through communication between the device vendor and the device purchaser.

However, in the abnormal condition, detailed communication and contracting procedures between the device vendor and the device purchaser may not be implemented. Therefore, in the abnormal condition, the device vendor first combines the CPS device 10 with an ownership certificate recorded on a physical medium and vends the combination to the device purchaser. The installation device 80 reads out the ownership certificate from the physical medium in response to an operation input by the device purchaser to grant the installation device 80 the ownership of the CPS device 10 first (the ownership certificate is first issued to the installation device 80).

In this way, anyone who has the installation device 80 can purchase an ownership certificate and a CPS device and can issue the ownership certificate from the installation device 80 to its own CPS server. In this case, since the device vendor does not need to receive information from the device purchaser, it is easier to distribute and vend the CPS device 10.

Although FIG. 11 is described as the initial registration flow in the case of the abnormal condition, the same flow as that of FIG. 11 may be implemented in the normal condition. In that case, the remote RV server device 60 and the remote CPS server device 40 are used instead of the local RV server device 70 and the local CPS server device 50, respectively.

The ownership certificate is first issued to the installation device 80, and furthermore, the installation device 80 then issues an ownership certificate to the remote CPS server device 40.

In FIG. 11, the signature key of the installation device 80 is assumed to be a unified key that is common for all installation devices 80. In a case where a signature key of the installation device 80 is an individual key, a group key, or the like, it is necessary to specify which key is to be transmitted when the installation device management server device 100 transfers the public key of the installation device 80 to the ownership certificate management server device 110. Therefore, the device vendor is required to identify the device purchaser in advance. In addition, the device vendor obtains identification information for identifying the installation device 80 owned by the device purchaser from the device purchaser, acquires the public key of the installation device 80 identified by the identification information from the installation device management server device 100, and issues an ownership certificate.

In the first embodiment, various devices hold signature keys (private keys). The devices that hold the signature keys in the first embodiment are the CPS device 10, the ownership certificate management server device 110, the remote CPS server device 40, the local CPS server device 50, and the installation device 80. The signature keys of the CPS device 10, the ownership certificate management server device 110, the remote CPS server device 40, and the local CPS server device 50 can each update their keys in independent timing, since the public keys thereof are basically included in the ownership certificate and distributed. However, after updating the signature keys, the former signature keys are required to be held while the ownership certificates containing the former public keys are distributed. This is to determine whether the public keys contained in the ownership certificates are the public keys corresponding to their own the signature keys.

On the other hand, the signature key of the installation device 80 requires careful updating since the public key corresponding to its own signature key is managed by the installation device management server device 100. In a case where the signature key of the installation device 80 is an individual key, each installation device 80 may update the key in independent timing. Each installation device 80 transmits a new public key to the installation device management server device 100 in the normal condition, and the installation device management server device 100 stores the public key. In a case where the signature key of the installation device 80 is a unified key, the installation device management server device 100 generates a new unified key and distributes the new unified key to all installation devices 80 in the normal condition. However, in a case where the number of the installation devices 80 is very large, or a case where a connection to the Internet 120 is cut off in the middle of key distribution, there is a situation in which the installation device 80 containing the former unified key and the installation device 80 containing the new unified key are present together. In such a case, the ownership certificate management server device 110 in the flow of FIG. 11 may issue an ownership certificate for each of the former and new unified keys and may write those two ownership certificates into the physical medium. The installation device 80 reads these ownership certificates, and selects and uses the ownership certificate containing the public key corresponding to its own signature key. In a case where the signature key of the installation device 80 is a group key, the key update is performed by the installation device management server device 100 in the same manner as in the case of a unified key.

In the first embodiment, the installation device 80 detects, in advance, whether the installation device 80 can be connected to the remote RV server device 60, and then transmits the initial registration destination request received from the CPS device 10 to the rendezvous server (remote RV server device 60 or local RV server device 70). It is considered that there are many other possible ways to transmit this request.

For example, the installation device 80 may transmit the initial registration destination request that has been received from the CPS device 10 to the remote RV server device 60 first, and on failure, the installation device 80 may then transmit the initial registration destination request to the local RV server device 70.

For example, the installation device 80 may also be a mirror server of the rendezvous server. In this case, the installation device 80 communicates with the remote RV server device 60 and the local RV server device 70 periodically in advance to acquire and store candidate data for the initial registration destination. In a case of receiving the initial registration destination request from the CPS device, the installation device 80 searches the candidate data to find an appropriate initial registration destination and returns the result to the CPS device 10.

In either case, the installation device 80 can answer, to the CPS device 10, the appropriate initial registration destination based on a communication state between the installation device 80 and the Internet 120.

As described above, the information processing system 200 according to the first embodiment includes the installation device and the CPS device 10. In the installation device 80, the detection unit 254 detects the communication state of the Internet 120 (first network) to which the remote CPS server device 40 (first CPS server device) is connected. The determination unit 256 determines the remote CPS server device 40 or the local CPS server device 50 (second CPS server device) as the initial registration destination based on the communication state. Then, the communication unit 252 (first communication unit) transmits the notification indicating the initial registration destination to the CPS device 10. The CPS device 10 stores the initial registration destination included in the notification in the memory unit 206 in a case where the memory control unit 205 receives the notification from the installation device 80. Then, the registration processing unit 204 is connected to the initial registration destination and performs the initial registration of the CPS device 10.

As a result, the information processing system 200 according to the first embodiment can efficiently and safely perform the initial registration operation even through the number of devices increases. For example, in a case of initially registering the CPS device 10 with the CPS server, the initial registration process can be performed efficiently and safely in both normal and abnormal conditions, even with the configuration in which a plurality of the CPS servers exist in different locations.

Second Embodiment

Next, a second embodiment will be described. In the description of the second embodiment, similar descriptions to the first embodiment will not be repeated, and the points that differ from the first embodiment will be described. In the first embodiment, the CPS device 10 acquires the initial registration destination through the local RV server device 70 and the remote RV server device 60. In the second embodiment, an installation device 80-2 (see FIG. 13) directly notifies the CPS device 10 of the initial registration destination.

In the first embodiment, the public key of the installation device 80 was centrally managed by the installation device management server device 100. In the first embodiment, operation is relatively easy in a case where the signature key of the installation device 80 is a unified key that is common to all installation devices 80. By contrast, in a case where the signature key is an individual key that differs for each of installation devices 80, it is time-consuming to manage key updates and to identify an issuance destination of the ownership certificate. Therefore, in the second embodiment, a new "vending device" is provided in a case where the signature key of the installation device 80-2 is an individual key. As a result, distribution of the CPS device 10 is easier in the abnormal condition.

Example of Device Configuration

Figure 13:
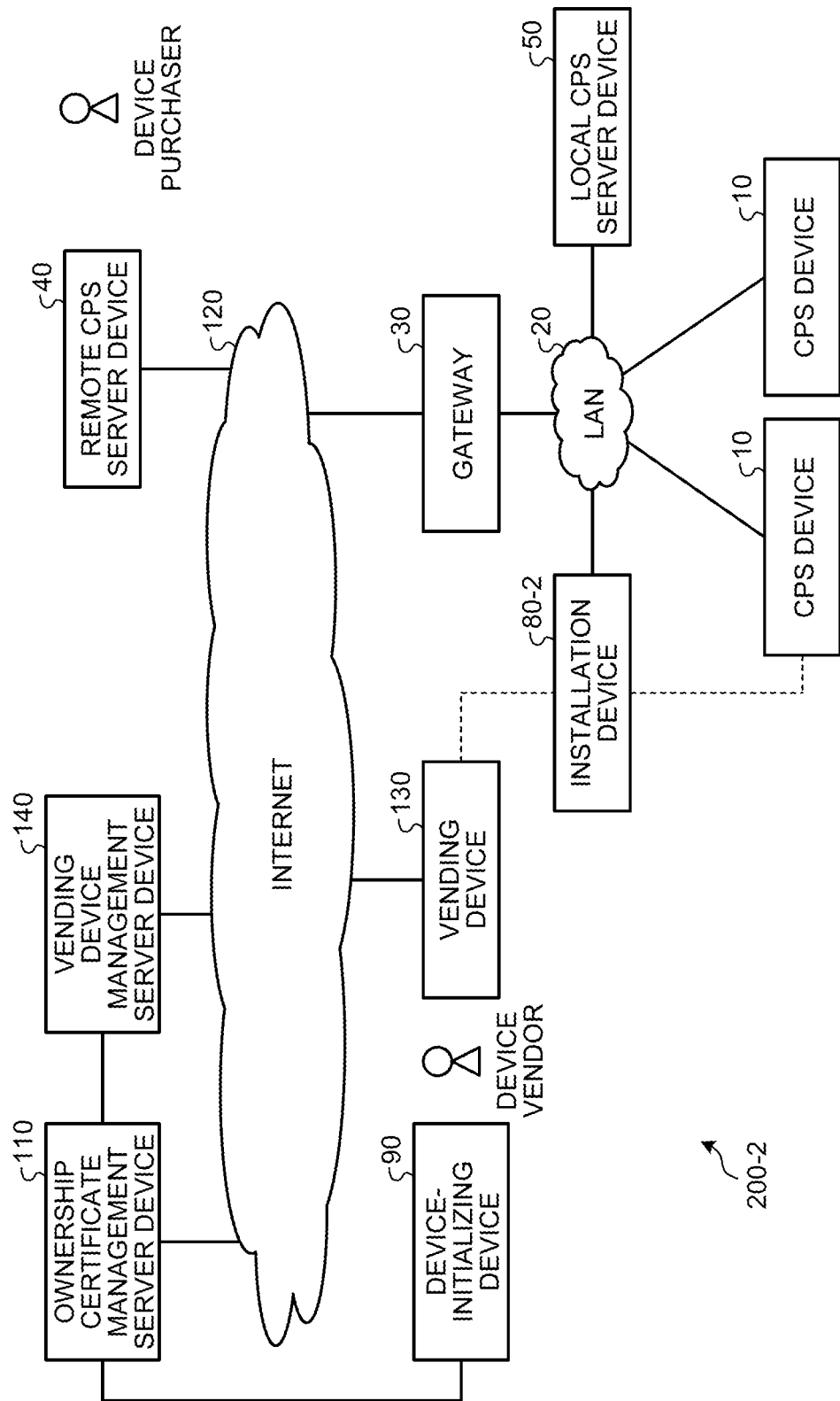
FIG. 13 is a diagram illustrating an example of a device configuration of an information processing system according to a second embodiment.

FIG. 13 is a diagram illustrating an example of a device configuration of an information processing system 200-2 according to the second embodiment. In the example in FIG. 13, as compared with the first embodiment (see FIG. 1), the remote RV server device 60, the local RV server device 70, and the installation device management server device 100 are not provided, and a vending device 130 and a vending device management server device 140 are provided.

The vending device 130 is a device used by the device vendor to vend the CPS device 10. For example, the vending device 130 is achieved as an application running on a smartphone. The vending device 130 is provided with a user authentication function and can only be operated by the device vendor and operators entrusted by the device vendor. The vending device 130 has its own signature key, which is a unified key common to all the vending devices 130. In addition, the vending device 130 has a communication function that communicates directly with the adjacent installation device 80-2 via, for example, Bluetooth (registered trademark) or the wireless LAN.

The vending device management server device 140 is a server device that manages a signature key of the vending device 130. The vending device management server device 140 is managed by the device vendor. The vending device management server device 140 stores a public key of the vending device 130, provides the public key to the ownership certificate management server device 110, and manages a key update process for the vending device 130.

Example of Functional Configuration of Each Device

Functional configurations of the devices according to the second embodiment will be described below. Since various devices have the same configurations as those of the first embodiment, functional configurations of the devices with notable changes compared to the first embodiment will be described.

Figure 14:
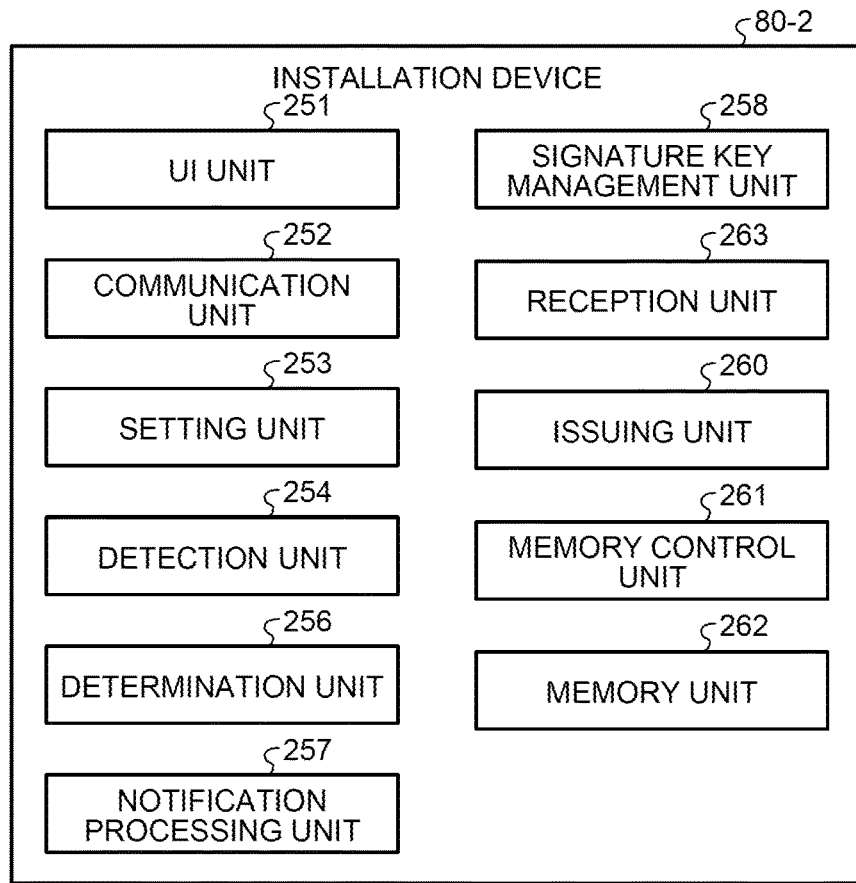
FIG. 14 is a diagram illustrating an example of a functional configuration of an installation device according to the second embodiment.

FIG. 14 is a diagram illustrating an example of a functional configuration of the installation device 80-2 according to the second embodiment. The installation device 80-2 according to the second embodiment has the UI unit 251, the communication unit 252, the setting unit 253, the detection unit 254, the notification processing unit 257, the signature key management unit 258, the issuing unit 260, the memory control unit 261, the memory unit 262, and a reception unit 263. In the second embodiment, the RV transmitting unit 255 and the reading unit 259 are not provided, and the reception unit 263 is provided.

The UI unit 251, the setting unit 253, the detection unit 254, the issuing unit 260, and the memory control unit 261 are the same as those of the first embodiment.

The communication unit 252 further communicates with the vending device 130.

The notification processing unit 257 notifies the CPS device 10 of an address of the appropriate CPS server (remote CPS server device 40 or local CPS server device 50) according to a communication state detected by the detection unit 254.

The signature key management unit 258 manages the updating of a signature key. The signature key of the installation device 80-2 is an individual key and is updated by the signature key management unit 258 in predetermined timing.

The memory unit 262 further stores addresses of the remote CPS server device 40 and the local CPS server device 50.

The reception unit 263 communicates with the vending device 130 through the communication unit 152 and receives an issuance of an ownership certificate from the vending device 130.

Figure 15:
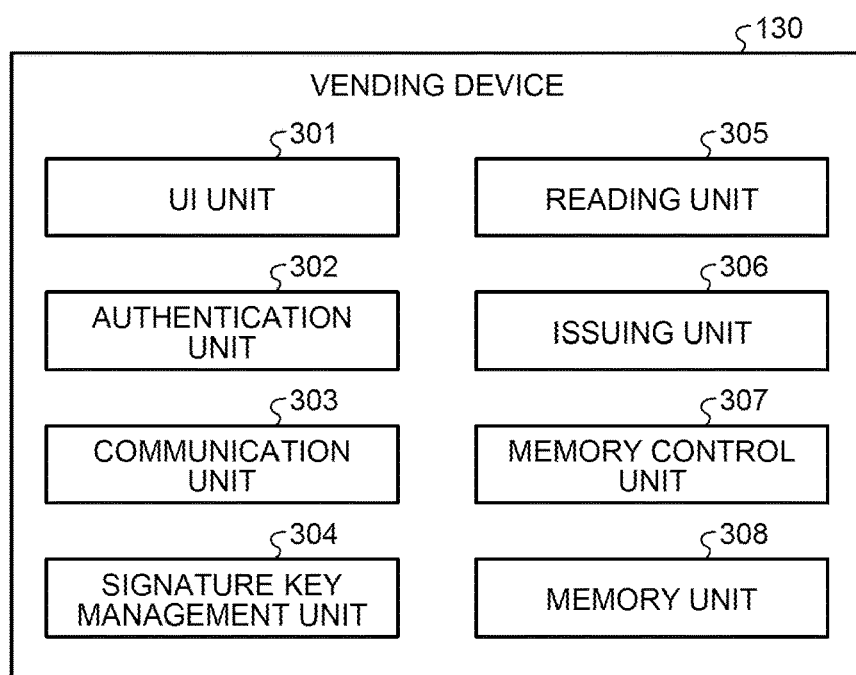
FIG. 15 is a diagram illustrating an example of a functional configuration of a vending device according to the second embodiment.

FIG. 15 is a diagram illustrating an example of a functional configuration of the vending device 130 according to the second embodiment. The vending device 130 according to the second embodiment has a UI unit 301, an authentication unit 302, a communication unit 303, a signature key management unit 304, a reading unit 305, an issuing unit 306, a memory control unit 307, and a memory unit 308.

The UI unit 301 receives an operation from a user and provides information in response to the operation. For example, in a case where the vending device 130 is a smart device such as a smartphone, the UI unit 301 is a touch screen or the like.

The authentication unit 302 performs user authentication. For example, the authentication unit 302 prompts a user to enter a user name and a password, and allows the user to operate the vending device 130 only in a case where the correct input is made.

The communication unit 303 communicates with other devices by using the wired LAN, the wireless LAN, and the near field communication standard. For example, the communication unit 303 communicates with other devices via the Internet 120 or the LAN 20. For example, the communication unit 303 is also connected to and communicates with the installation device 80-2.

The signature key management unit 304 communicates with the vending device management server device 140 through the communication unit 303 to manage a signature key.

The reading unit 305 reads out the ownership certificate from a physical medium. The physical medium is, for example, microSD card, QR code (registered trademark), or the like.

The issuing unit 306 communicates with the installation device 80-2 through the communication unit 303 and issues an ownership certificate indicating that ownership of the CPS device 10 is transferred to the installation device 80-2.

The memory control unit 307 performs memory control for information stored in the memory unit 308.

The memory unit 308 stores information. For example, the memory unit 308 stores a key pair for signing. The public key of this key pair is written in the ownership certificate. For example, the memory unit 308 also stores the ownership certificate read by the reading unit 305.

Figure 16:
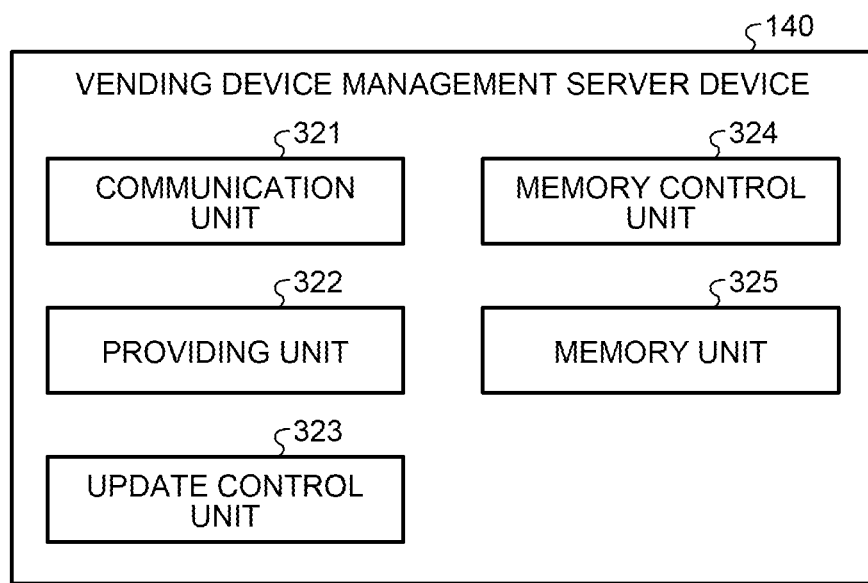
FIG. 16 is a diagram illustrating an example of a functional configuration of a vending device management server device according to the second embodiment.

FIG. 16 is a diagram illustrating an example of a functional configuration of the vending device management server device 140 according to the second embodiment. The vending device management server device 140 according to the second embodiment includes a communication unit 321, a providing unit 322, an update control unit 323, a memory control unit 324, and a memory unit 325.

The communication unit 321 communicates with other devices via a network such as the Internet 120.

The providing unit 322 provides a public key of the vending device 130 to the ownership certificate management server device 110.

The update control unit 323 controls an updating process of a signature key of the vending device 130.

The memory control unit 324 performs memory control for information stored in the memory unit 325.

The memory unit 325 stores information. For example, the memory unit 325 stores information such as an identifier and the signature key of the vending device 130.

Example of Initial Registration Process

Figure 17:
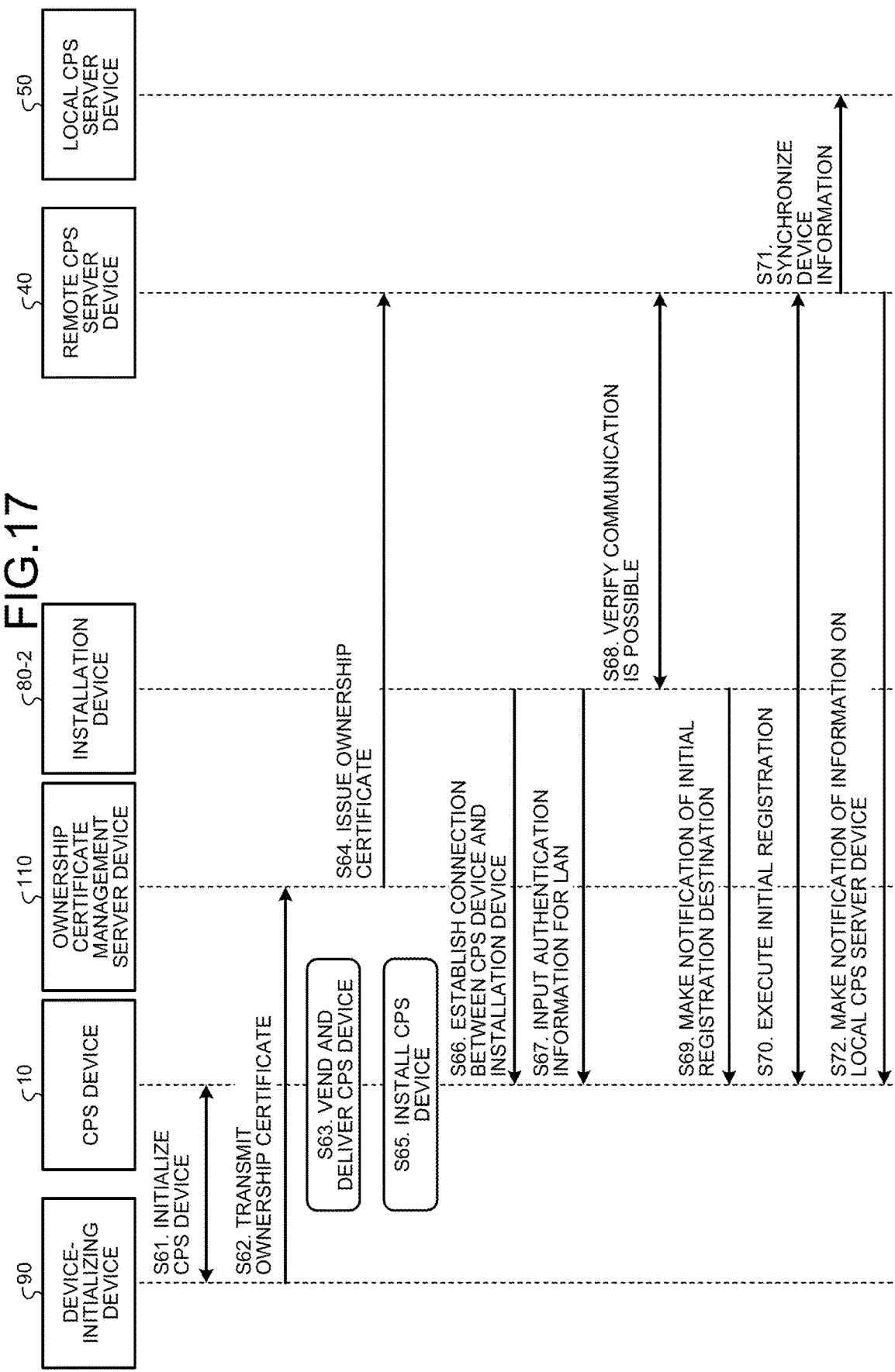
FIG. 17 is a sequence diagram illustrating an example of an initial registration process (normal condition) according to the second embodiment.

FIG. 17 is a sequence diagram illustrating an example of an initial registration process (normal condition) according to the second embodiment. FIG. 17 is a sequence diagram illustrating an example of a flow of the initial registration process in the normal condition according to the second embodiment.

The processes at steps S61 to S67 are the same processes at steps S1 to S5, S7, and S8 according to the first embodiment (see FIG. 9).

Next, the installation device 80-2 verifies that communication with the remote CPS server device 40 is possible (step S68). The addresses of the remote CPS server device 40 and the local CPS server device 50 are set in advance in the installation device 80-2 by, for example, the device purchaser.

Next, the installation device 80-2 notifies the CPS device 10 of the initial registration destination (step S69). In the example in FIG. 17, the installation device 80-2 notifies the CPS device 10 of the address of the remote CPS server device 40.

The processes at steps S70 to S72 are the same processes at steps S12 to S14 according to the first embodiment (see FIG. 9).

According to the second embodiment, in a case where information of the remote CPS server device 40 and the local CPS server device 50 have already been input into the installation device 80-2, the CPS device 10 can be notified of the initial registration destination without using the rendezvous server (remote RV server device 60 or local RV server device 70).

Figure 18:
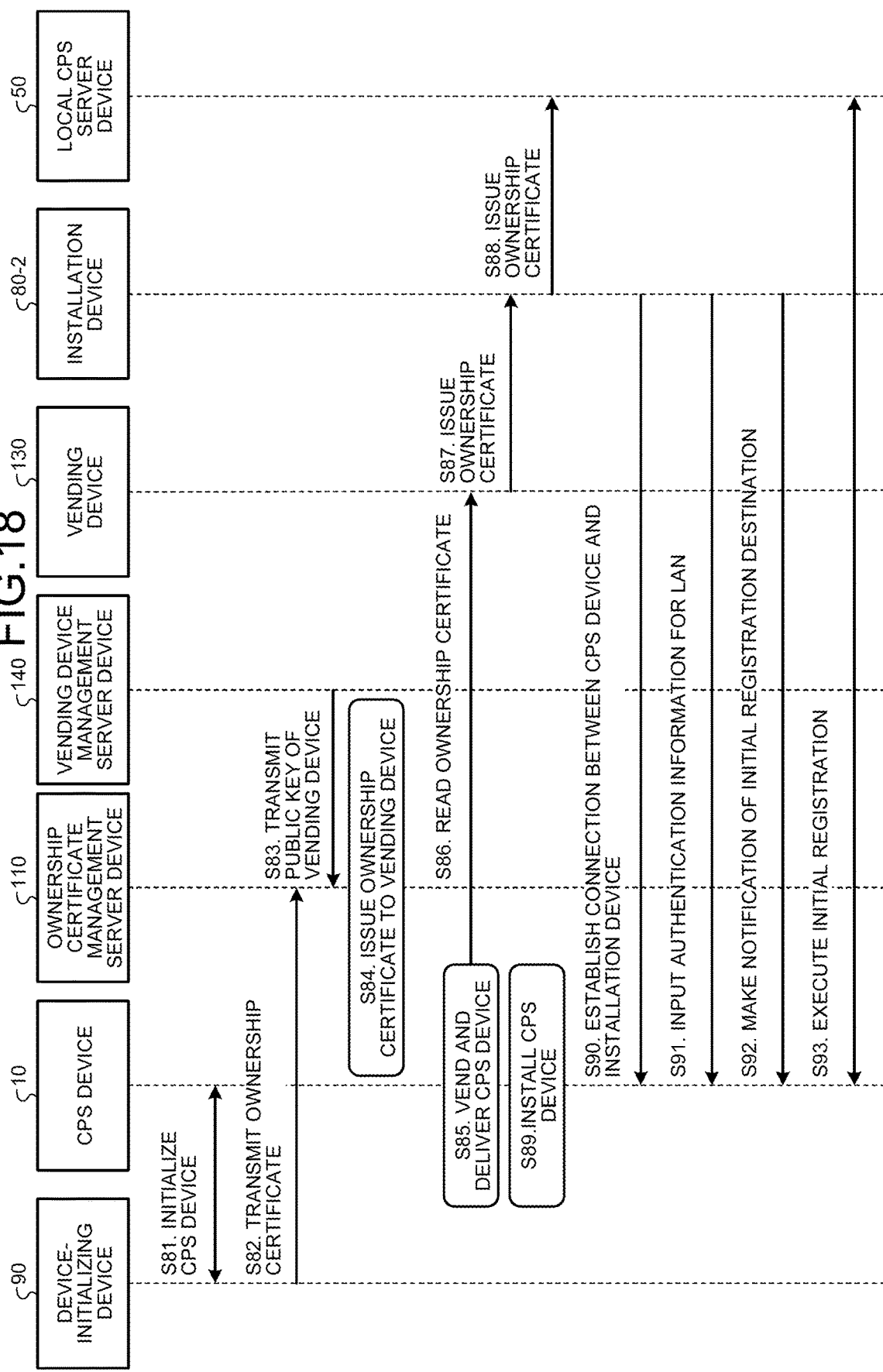
FIG. 18 is a sequence diagram illustrating an example of an initial registration process (abnormal condition) according to the second embodiment.

FIG. 18 is a sequence diagram illustrating an example of an initial registration process (abnormal condition) according to the second embodiment. FIG. 18 is a sequence diagram illustrating an example of a flow of the initial registration process in the abnormal condition according to the second embodiment.

The processes at steps S81 and S82 are the same processes at steps S31 and S32 according to the first embodiment (see FIG. 11).

Next, the vending device management server device 140 transmits the public key of the vending device 130 to the ownership certificate management server device 110 (step S83).

Next, the ownership certificate management server device 110 (issuing unit 293) issues an ownership certificate indicating that ownership of the CPS device 10 has been transferred, to the vending device 130 (step S84). The ownership certificate is written into a physical medium by the ownership certificate management server device 110 (writing unit 294).

Next, the device vendor vends the CPS device 10 to the device purchaser and delivers the CPS device 10 to the device purchaser (step S85). In this case, it is assumed that the device vendor has the CPS device 10, the ownership certificate written into the physical medium at step S84, and the vending device, and that the device purchaser has the installation device 80-2.

Next, the vending device 130 (reading unit 305) reads the ownership certificate from the physical medium in response to an operation input by the device vendor (step S86).

Next, the vending device 130 belonging to the device vendor and the installation device 80-2 belonging to the device purchaser communicate with each other, and the vending device 130 (issuing unit 306) issues an ownership certificate indicating that ownership of the CPS device 10 is transferred from the vending device 130 to the installation device 80-2 (step S87). Specifically, the issuing unit 306 communicates with the installation device 80-2 in response to an operation input by a user authenticated by the authentication unit 302, and information indicating that the ownership of the CPS device 10 has been further transferred to the installation device 80-2 is appended to the ownership certificate read through the process at step S86 to issue the ownership certificate.

Next, the installation device 80-2 is connected to the LAN 20 and issues an ownership certificate to the local CPS server device (step S88).

The processes at steps S89 to S91 are the same processes at steps S38 to S41 according to the first embodiment (see FIG. 11).

Next, the installation device 80-2 notifies the CPS device 10 of the initial registration destination (step S92). Here, assuming that the installation device 80-2 has already detected that communication with the remote CPS server device 40 fails, the installation device 80-2 notifies the CPS device 10 of the address of the local CPS server device 50.

The process at step S93 is the same process at step S45 according to the first embodiment (see FIG. 11).

Thus, in the second embodiment, the ownership certificate is issued to the local CPS server device 50 through the vending device 130 having the unified key and the installation device 80-2 having the individual key. The signature key of the vending device 130 is a unified key, but operators who can operate the vending device 130 are restricted by user authentication. On the other hand, the installation device 80-2 can be owned and operated by anyone, but the signature key thereof is an individual key.

Specifically, the signature key management unit 258 of the installation device 80-2 manages a signature key different for each installation device 80-2. The signature key management unit 304 of the vending device 130 manages the signature key of the vending device 130. The issuing unit 293 of the ownership certificate management server device 110 issues an ownership certificate that includes a public key corresponding to a signature key of the signature key management unit 304. The issuing unit 306 of the vending device 130 issues an ownership certificate that includes a public key corresponding to a signature key of the signature key management unit 258.

In the second embodiment, the device vendor and the device purchaser meet face-to-face before the process of issuing an ownership certificate from the vending device 130 to the installation device 80-2 (step S87), the CPS device 10 is handed over (step S85), and the process of reading the ownership certificate (step S86) is performed. In this way, the management of the signature keys of the installation device 80-2 and the vending device 130 can be simplified, while at the same time preventing anyone other than the authorized device purchaser from receiving an issuance of the ownership certificate fraudulently.

Finally, an example of a hardware configuration of each device according to the first and second embodiments.

Example of Hardware Configuration

Figure 19:
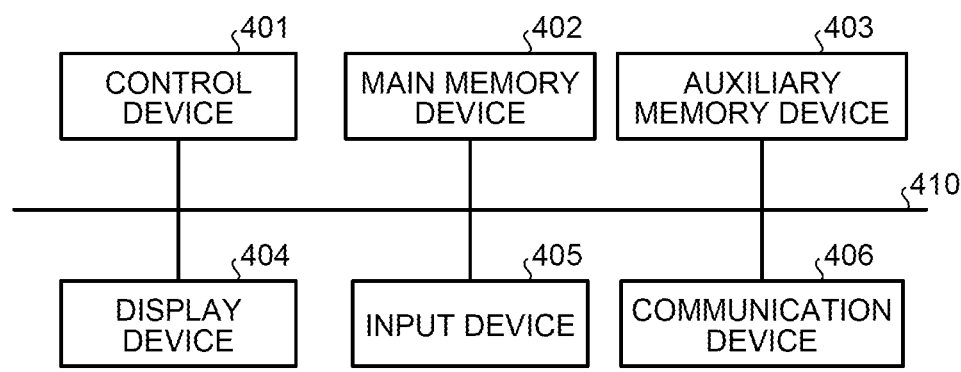
FIG. 19 is a diagram illustrating an example of a hardware configuration of each device according to the first and second embodiments.

FIG. 19 is a diagram illustrating an example of a hardware configuration of each device according to the first and second embodiments (CPS device 10, remote CPS server device 40, local CPS server device 50, remote RV server device 60, local RV server device 70, installation device 80 (80-2), device-initializing device 90, installation device management server device 100, ownership certificate management server device 110, vending device 130, and vending device management server device 140).

Each device includes a control device 401, a main memory device 402, an auxiliary memory device 403, a display device 404, an input device 405, and a communication device 406. The control device 401, the main memory device 402, the auxiliary memory device 403, the display device 404, the input device 405, and the communication device 406 are connected via a bus 410.

The control device 401 executes a computer program read out from the auxiliary memory device 403 to the main memory device 402. The main memory device 402 is a memory such as read only memory (ROM) and random access memory (RAM). The auxiliary memory device 403 is a hard disk drive (HDD), solid state drive (SSD), or memory card.

The display device 404 displays display information. The display device 404 is, for example, a liquid crystal display or the like. The input device 405 is an interface for receiving an input of information. The input device 405 is, for example, a keyboard, a mouse, or the like. In a case where the device is a smart device, such as a smartphone or a tablet device, the display device 404 and the input device 405 are, for example, touch panels. A display function and an input function of an external device connected through the communication device 406 may be used without the display device 404 and the input device 405. The communication device 406 is an interface for communicating with other devices.

A computer program to be executed on each device is provided as a computer program product recorded on a computer-readable storage medium such as CD-ROM, memory card, CD-R, and digital versatile disc (DVD) in an installable or executable format file.

The computer program to be executed on each device may be configured to be stored in a computer connected to a network, such as the Internet 120, and provided by downloading via the network. The computer program to be executed on each device may also be configured to be provided via a network such as the Internet without downloading the computer program.

The computer program to be executed on each device may be configured to be pre-loaded in ROM, or the like.

The computer program to be executed on each device has a modular structure including functional blocks among the functional configurations (functional blocks) of each device, which can also be implemented by the computer program. Regarding each of the functional blocks, as actual hardware, the control device 401 reads out the computer program from the storage medium and executes the computer program to load each functional block on the main memory device 402. That is, each functional block is generated on the main memory device 402.

Some or all of the functional blocks described above may be implemented by hardware such as integrated circuits (ICs) instead of software.

In a case where a plurality of processors are used to implement each of the functional blocks, each processor may implement one of the functional blocks or two or more of the functional blocks.

Any form of operation of the computer that implements each device may be employed. For example, the remote CPS server device 40, the remote RV server device 60, the installation device management server device 100, the ownership certificate management server device 110, the vending device 130, and the vending device management server device 140 may operate as a cloud system on a network such as the Internet 120.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
   an installation device;
   a cyber physical system (CPS) device; and
   an ownership certificate management server device, wherein
   the installation device comprises:
      one or more first hardware processors configured to:
         detect a communication state of a first network to which a first CPS server device is connected;
         determine the first CPS server device or a second CPS server device as an initial registration destination, based on the communication state; and
         transmit a notification indicating the initial registration destination to the CPS device, and the CPS device includes comprises:
      one or more second hardware processors configured to:
         store, upon receiving the notification from the installation device, the initial registration destination included in the notification in a memory unit; and
         connect to the initial registration destination, to perform initial registration of the CPS device; and
   the ownership certificate management server device comprises:
      one or more third hardware processors configured to:
         issue a first ownership certificate indicating that ownership of the CPS device has been transferred to the installation device; and
         write the first ownership certificate into a physical medium, wherein
      the one or more first hardware processors are further configured to:
         read out the first ownership certificate from the physical medium, and
         issue a second ownership certificate by appending information indicating that the ownership of the CPS device has been further transferred to the first or second CPS server device, to the first ownership certificate, and
      the first or second CPS server device performs, upon accepting a connection from the CPS device, mutual authentication with the CPS device by using the second ownership certificate before the initial registration of the CPS device is performed.

2. The system according to claim 1, wherein
   a first rendezvous server device is further connected to the first network,
   the or more second hardware processors are further configured to transmit an initial registration destination request to make a query about an initial registration destination, to the installation device,
   the one or more first hardware processors are further configured to:
      transmit, upon receiving the initial registration destination request, the initial registration destination request to the first rendezvous server device or a second rendezvous server device, based on the communication state,
      identify an address of the first or second CPS server device, based on a response of the initial registration destination request, and
      transmit the notification including the address of the first or second CPS server device to the CPS device.

3. The system according to claim 1, wherein
   the one or more first hardware processors are further configured to:
      perform mutual authentication with the CPS device by using the first ownership certificate, and
      set authentication information for connecting the CPS device to a second network, to the CPS device in a case where the mutual authentication is successful.

4. The system according to claim 1, wherein
   the one or more second hardware processors of the first CPS server device are further configured to:
      synchronize, with the second CPS server device, information of the CPS device, which is initially registered with the first CPS server device, and
      transmit an address of the second CPS server device to the CPS device, as information on an alternative CPS server for the first CPS server device, and
   the one or more second hardware processors of the second CPS server device are configured to:
      synchronize, with the first CPS server device, information of the CPS device, which is initially registered with the second CPS server device, after a connection to the first network is recovered; and
      transmit an address of the first CPS server device to the CPS device, as information on an alternative CPS server for the second CPS server device.

5. The system according to claim 1, wherein
   the one or more first hardware processors are further configured to determine the first CPS server device as the initial registration destination in a case where no communication failure to the first network has occurred, and determine the second CPS server device as the initial registration destination in a case where a communication failure to the first network has occurred.

6. An information processing system comprising:
   an installation device;
   a cyber physical system (CPS) device;
   an ownership certificate management server device; and
   a vending device,
   wherein
   the installation device comprises:
      one or more first hardware processors configured to:
         detect a communication state of a first network to which a first CPS server device is connected;

determine the first CPS server device or a second CPS server device as an initial registration destination, based on the communication state; and transmit a notification indicating the initial registration destination to the CPS device, the CPS device comprises:

one or more second hardware processors configured to:

store, upon receiving the notification from the installation device, the initial registration destination included in the notification in a memory; and connect to the initial registration destination, to perform initial registration of the CPS device, the ownership certificate management server device comprises:

one or more third hardware processors configured to:

issue a third ownership certificate indicating that ownership of the CPS device has been transferred to the vending device; and write the third ownership certificate into a physical medium, and the vending device includes comprises:

one or more fourth hardware processors configured to:

read out the third ownership certificate from the physical medium;

authenticate a user, and communicate with the installation device according to an operation of the user who is authenticated by the one or more fourth hardware processors and issue a fourth ownership certificate by appending information indicating that the ownership of the CPS device has been further transferred to the installation device, to the third ownership certificate.

7. The system according to claim 6, wherein the one or more first hardware processors are further configured to manage a first signature key that differs for each installation device, the one or more fourth hardware processors are further configured to:

manage a second signature key of the vending device, issue the third ownership certificate that includes a public key corresponding to the second signature key, and issue the fourth ownership certificate that includes a public key corresponding to the first signature key.

* * * * *

UNITED STATES PATENT AND TRADEMARK OFFICE
CERTIFICATE OF CORRECTION

PATENT NO. : 12,231,422 B2
APPLICATION NO. : 17/822738
DATED : February 18, 2025
INVENTOR(S) : Toshio Ito It is certified that error appears in the above-identified patent and that said Letters Patent is hereby corrected as shown below:

In the Claims

Claim 2, Column 24, Line 7, "the or more" should read as --the one or more--.

Signed and Sealed this
Twenty-fifth Day of March, 2025

Coke Morgan Stewart
*Acting Director of the United States Patent and Trademark Office*